(12) United States Patent
Mishina et al.

(10) Patent No.: US 11,443,090 B2
(45) Date of Patent: Sep. 13, 2022

(54) OPTIMIZATION DEVICE AND METHOD OF CONTROLLING OPTIMIZATION DEVICE

(71) Applicant: FUJITSU LIMITED, Kawasaki (JP)

(72) Inventors: Takeshi Mishina, Kawasaki (JP); Satoshi Matsuura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/178,290

(22) Filed: Feb. 18, 2021

(65) Prior Publication Data
US 2021/0173990 A1    Jun. 10, 2021

Related U.S. Application Data

(63) Continuation of application No. PCT/JP2018/034234, filed on Sep. 14, 2018.

(51) Int. Cl.
*G06F 30/337* (2020.01)
*G06F 111/08* (2020.01)

(52) U.S. Cl.
CPC ........ *G06F 30/337* (2020.01); *G06F 2111/08* (2020.01)

(58) Field of Classification Search
USPC ......................................................... 716/132
See application file for complete search history.

(56) References Cited

U.S. PATENT DOCUMENTS

| 2008/0215862 | A1   | 9/2008 | Haga et al. |
| 2016/0118106 | A1 * | 4/2016 | Yoshimura ............... G11C 7/04 365/156 |
| 2018/0075342 | A1   | 3/2018 | Tamura et al. |
| 2020/0042570 | A1 * | 2/2020 | Tamura .................... G06N 3/08 |

FOREIGN PATENT DOCUMENTS

| JP | 2002-94362 A | 3/2002 |
| JP | 2018-041351 A | 3/2018 |
| WO | 2006/001365 A1 | 1/2006 |

OTHER PUBLICATIONS

Extended European Search Report dated Sep. 2, 2021 for corresponding European Patent Application No. 18932982.4, 8 pages.
(Continued)

*Primary Examiner* — Bryce M Aisaka
(74) *Attorney, Agent, or Firm* — Fujitsu Patent Center

(57) ABSTRACT

An optimization device includes: a memory; and a processor configured to: calculate, as bit operations, when any bit in a bit string representing a state of an Ising model is inverted, an energy change value of the Ising model based on a coefficient indicating magnitude of an interaction between an own bit and the inverted bit in the bit string; output a first signal indicating inversion availability of the own bit according to the energy change value and a second signal indicating the energy change value; select the bit to be inverted in the bit string and the energy change value corresponding to the bit based on the first signal and the second signal; output a fourth signal indicating the selected energy change value; and calculate energy of the Ising model based on the energy change value indicated by the fourth signal.

6 Claims, 19 Drawing Sheets

(56) References Cited

OTHER PUBLICATIONS

International Search Report and Written Opinion of the International Searching Authority (Form PCT/ISA/210, 220, and 237), mailed in connection with PCT/JP2018/034234 and dated Dec. 4, 2018 (Total 8 pages).
Canadian Office Action dated Mar. 2, 2022 for corresponding Canadian Patent Application No. 3109737, 5 pages. *Please note US-2016/0118106-A1 cited herewith, was previously cited in an IDS filed on Nov. 30, 2021.*.

* cited by examiner

OPTIMIZATION DEVICE AND METHOD OF CONTROLLING OPTIMIZATION DEVICE

CROSS-REFERENCE TO RELATED APPLICATION

This application is a continuation application of International Application PCT/JP2018/034234 filed on Sep. 14, 2018 and designated the U.S., the entire contents of which are incorporated herein by reference.

FIELD

The embodiments discussed herein are related to an optimization device and a method of controlling an optimization device.

BACKGROUND

As a method of solving a muitivariable optimization problem that a von Neumann computer is not good at, there is an optimization device (sometimes referred to as an Ising machine or a Boltzmann machine) using an Ising energy function. The optimization device performs calculation by replacing a problem to be calculated with an Ising model that is a model representing behavior of spins of magnetic material.

Related art is disclosed in Japanese Laid-open Patent Publication No. 2002-94362 and International Publication Pamphlet No. WO 2006/001365.

SUMMARY

According to an aspect of the embodiments, an optimization device includes: a memory; and a processor coupled to the memory and configured to: calculate, as a plurality of bit operations, when any bit in a bit string representing a state of an Ising model is inverted, an energy change value of the Ising model on the basis of a coefficient indicating magnitude of an interaction between an own bit and the inverted bit in the bit string; output a first signal indicating inversion availability of the own bit according to the energy change value and a second signal indicating the energy change value; select the bit to be inverted in the bit string and the energy change value corresponding to the bit on the basis of the first signal and the second signal; output a third signal indicating the selected bit to each of the plurality of bit operations; output a fourth signal indicating the selected energy change value; and calculate energy of the Ising model on the basis of the energy change value indicated by the fourth signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The optimization device can also be modeled using, for example, a neural network. In that case, each of a plurality of bits (spin bits) corresponding to a plurality of spins included in the Ising model functions as a neuron that outputs 0 or 1 depending on a weight coefficient (also referred to as a coupling coefficient) indicating magnitude of an interaction between another bit and an own bit. The optimization device obtains, as a solution, a combination of each value of bits in which the minimum value of values (referred to as energy) of the above-described energy function (also referred to as a cost function or an objective function) is obtained, by a stochastic search method such as simulated annealing, for example.

For example, the optimization device is implemented by an electronic circuit including various circuit elements. In a circuit, for example, there is a proposal to reduce the number of logical stages of a selector without increasing the number of signals of an address input by controlling an address of the selector using a signal obtained by combining upper two bits of the address input.

Note that, there is a proposal of a program execution device that randomly determines processing to be executed according to current information by generating a random number at the time of execution and specifying the current information.

In ab optimization device, a circuit scale increases as the number of spin bits increases. The circuit area becomes larger and the length of a signal traffic path in the device increases as the circuit scale increases. The increase in the length of the traffic path incurs a delay in signal transmission via the path, which causes a decrease in operation speed.

In one aspect, an optimization device and a method of controlling an optimization device capable of suppressing a decrease in operation speed with an increase in circuit scale may be provided.

Hereinafter, the present embodiment will be described with reference to the drawings.

First Embodiment

A first embodiment will be described.

Figure 1:
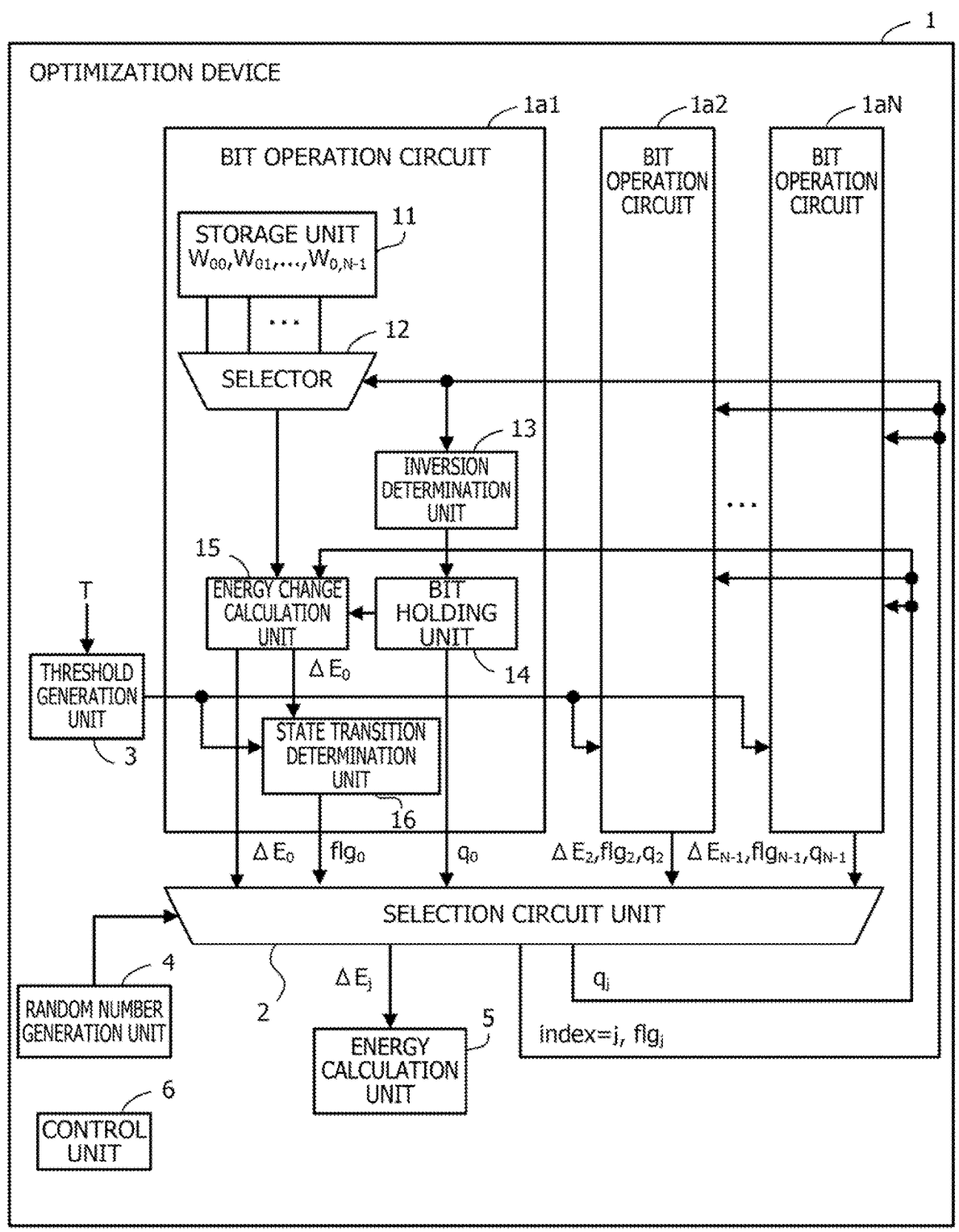
FIG. 1 is a diagram illustrating an optimization device according to a first embodiment.

FIG. 1 is a diagram illustrating an optimization device according to the first embodiment.

An optimization device 1 searches for values (ground state) of bits of when an energy function becomes minimum, of combinations (states) of each value of a plurality of bits (spin bits) corresponding to a plurality of spins included in an Ising model converted from a problem to be calculated.

Here, an Ising-type energy function E(x) is defined by, for example, the following expression (1).

[Math. 1]
$$E(x) = -\sum_{\langle i,j \rangle} W_{ij}x_i x_j - \sum_i b_i x_i \quad (1)$$

The first term on the right side is an integration of products of values (0 or 1) of two bits and a coupling coefficient, for all of combinations of two bits selectable from all of bits included in the Ising model without omission and duplication. The total number of bits included in the Ising model is N (N is an integer of 2 or larger). Furthermore, each of i and j is an integer of 0 or larger and N–1 or smaller. $x_i$ is a variable (also referred to as a state variable) representing the value of the i-th bit. $x_j$ is a variable representing the value of the j-th bit. $W_{ij}$ is a weight coefficient indicating the magnitude of an interaction between the i-th and j-th bits. Note that $W_{ii}=0$. Furthermore, in many cases, $W_{ij}=W_{ji}$ (in other words, for example, a coefficient matrix based on the weight coefficients is often a symmetric matrix).

The second term on the right side is a sum of products of each bias coefficients of all the bits and values of the bits. $b_i$ represents the bias coefficient of the i-th bit.

Furthermore, when the value of the variable $x_i$ changes to $1-x_i$, the increment of the variable $x_i$ can be expressed as $\Delta x_i = (1-x_i) - x_i = 1 - 2x_i$. Thus, an energy change $\Delta E_i$ accompanying spin inversion (a change in value) is expressed by the expression (2) below.

[Math. 2]
$$\begin{aligned}\Delta E_i &= E(x)|_{x_i \to 1-x_i} - E(x) \quad (2)\\ &= -\Delta x_i \left( \sum_j W_{ij}x_j + b_i \right)\\ &= -\Delta x_i h_i\\ &= \begin{cases} -h_i & (\text{for } x_i = 0 \to 1) \\ +h_i & (\text{for } x_i = 1 \to 0) \end{cases}\end{aligned}$$

$h_i$ is called local field and is expressed by the expression (3),

[Math. 3]
$$h_i = \sum_j W_{ij}x_j + b_i \quad (3)$$

The local field $h_i$ multiplied by a sign (+1 or −1) depending on $\Delta x_i$ is the energy change $\Delta E_i$. The change $\Delta h_i$ of the local field $h_i$ is expressed by the expression (4).

[Math. 4]
$$\Delta h_i = \begin{cases} +W_{ij} & (\text{for } x_i = 0 \to 1) \\ -W_{ij} & (\text{for } x_i = 1 \to 0) \end{cases} \quad (4)$$

Processing of updating the local field $h_i$ when a certain variable $x_j$ changes is performed in parallel.

The optimization device 1 is, for example, a one-chip semiconductor integrated circuit and is implemented using a field programmable gate array (FPGA) and the like. The optimization device 1 includes a bit operation circuits 1a1, 1a2, . . . , and 1aN (a plurality of bit operation circuits), a selection circuit unit 2, a threshold generation unit 3, a random number generation unit 4, an energy calculation unit 5, and a control unit 6. Here, N is a total number of the bit operation circuits included in the optimization device 1. Identification information (index=0, 1, . . . , N–1) is associated with each of the bit operation circuits 1a1, 1a2, . . . , and 1aN.

The bit operation circuit 1a1, . . . , or 1aN is a unit element that provides one bit included in a bit string representing a state of the Ising model. The bit string may be called spin bit string, state vector, or the like. Each of the bit operation circuits 1a1, . . . , and 1aN stores the weight coefficient between its own bit and another bit. When any bit in the spin bit string is inverted, each of the bit operation circuits 1a1, . . . , and 1aN calculates an energy change value ΔE of the Ising model on the basis of the weight coefficient between the own bit and the inverted bit. ΔE is calculated by the expression (2). Each of the bit operation circuits 1a1, . . . , and 1aN outputs a signal (first signal) indicating inversion availability of the own bit according to the energy change value and a signal (second signal) indicating the energy change value ΔE to the selection circuit unit 2.

The selection circuit unit 2 receives the signals output from each of the bit operation circuits 1a1, . . . , and 1aN. The selection circuit unit 2 selects a bit to be inverted (inversion bit) in the spin bit string and the energy change value corresponding to the bit on the basis of the signals output from each of the bit operation circuits 1a1, . . . , and 1aN. The selection circuit unit 2 outputs a signal (third signal) indicating the selected bit (inversion bit) to each of the bit operation circuits 1a1, . . . , and 1aN, and also outputs a signal (fourth signal) indicating the selected energy change value to the energy calculation unit 5. The signal indicating the selected inversion bit includes a signal indicating identification information of the inversion bit (index=j), a flag ($flg_j=1$) indicating inversion availability, and a current value $q_j$ of the inversion bit (a value before the inversion this time). Note that none of the bits may be inverted. In the case where neither bit is inverted, the selection circuit unit 2 outputs $flg_j=0$. For the index=j, the energy change value supplied from the selection circuit unit 2 to the energy calculation unit 5 is expressed as $\Delta E_j$.

Note that the selection circuit unit 2 may receive signal indicating identification information (index) of each bit operation circuit from each of the bit operation circuits 1a1, . . . , and 1aN. The selection circuit unit 2 may select the identification information corresponding to a spin bit to be inverted together with the energy change value on the basis of the signal indicating the identification information. Alternatively, the selection circuit unit 2 may generate and output the identification information of the bit operation circuit corresponding to the spin bit to be inverted by the selection circuit unit 2.

The threshold generation unit 3 generates a threshold to be used for determining the inversion availability of a bit for each of the bit operation circuits 1a1, . . . , and 1aN. A signal indicating the threshold is output to each of the bit operation circuits 1a1, . . . , and 1aN. As will be described below, the threshold generation unit 3 uses a parameter (temperature parameter) T indicating temperature and a random number to generate the threshold. The threshold generation unit 3 includes a random number generation unit that generates the random number. Favorably, the threshold generation unit 3 individually includes the random number generation unit and individually generates and supplies the threshold for each of the bit operation circuits 1a1, . . . , and 1aN. Note that the threshold generation unit 3 may share the random number generation unit among a predetermined number of bit operation circuits.

The random number generation unit 4 generates and outputs the random number bit to the selection circuit unit 2. The random number bit generated by the random number generation unit 4 is used for selecting the inversion bit by the selection circuit unit 2.

The energy calculation unit 5 calculates the energy of the Ising model. Specifically, the energy calculation unit 5 includes a register that holds the energy for the current state of the Ising model, and stores the energy E for the current state by the register. The energy calculation unit 5 receives the signal indicating the energy change value ΔE from the selection circuit unit 2, and updates E by adding ΔE to the energy E (E=E+ΔE). The energy calculation unit 5 stores the updated E in the register of the energy calculation unit 5.

The control unit 6 sets the temperature parameter T and the weight coefficient for each storage unit of the bit operation circuits 1a1, . . . , and 1aN, and controls the start and termination of operations by the bit operation circuits 1a1, . . . , and 1aN. The control unit 6 outputs an operation result. For example, when the operations using the bit operation circuits 1a1, . . . , and 1aN end, the control unit 6 reads and outputs the spin bit strings held in the bit operation circuits 1a1, . . . , and 1aN.

Next, a circuit configuration of the bit operation circuit will be described. The bit operation circuit 1a1 (index=0) will be mainly described, but other bit operation circuits can be implemented with a similar circuit configuration (for example, the index=X−1 is set for the X-th (X is an integer of 1 or more and N or less) bit operation circuit)).

The bit operation circuit 1a1 includes a storage unit 11, a selector 12, an inversion determination unit 13, a bit holding unit 14, an energy change calculation unit 15, and a state transition determination unit 16.

The storage unit 11 is, for example, a register, a static random access memory (SRAM), or the like. The storage unit 11 stores the weight coefficient between its own bit (here, the bit with the index=0) and another bit. Here, for the number of spin bits N, the total number of weight coefficients is $N^2$. The storage unit 11 stores N weight coefficients $W_{00}, W_{01}, \ldots,$ and $W_{0,N-1}$ for the bit with the index=0. Note that the storage unit 11 may be provided outside the bit operation circuit 1a1 and inside the optimization device 1 (the same similarly applies to the storage units of the other bit operation circuits).

When any bit in the spin bit string is inverted, the selector 12 reads the weight coefficient for the inverted bit from the storage unit 11 and outputs the read weight coefficient to the energy change calculation unit 15. That is, the selector 12 receives the identification information of the inversion bit from the selection circuit unit 2, reads the weight coefficient corresponding to the set of the inversion bit and its own bit from the storage unit 11, and outputs the weight coefficient to the energy change calculation unit 15.

The inversion determination unit 13 receives the signal indicating the index=j and $flg_j$ output by the selection circuit unit 2, and determines whether the own bit has been selected as the inversion bit on the basis of the signal. In the case where the own bit has been selected as the inversion bit (that is, the index=j indicates the own bit and $flg_j$ indicates inversion available), the inversion determination unit 13 inverts the bit stored in the bit holding unit 14. That is, in a case where the bit held in the bit holding unit 14 is 0, the bit is changed to 1. Meanwhile, in a case where the bit held in the bit holding unit 14 is 1, the bit is changed to 0.

The bit holding unit 14 is a register that holds one bit. The bit holding unit 14 outputs the held bit to the energy change calculation unit 15 and the selection circuit unit 2.

The energy change calculation unit 15 calculates an energy change value $\Delta E_0$ of the Ising model using the weight coefficient read from the storage unit 11 and outputs the energy change value $\Delta E_0$ to the state transition determination unit 16. Specifically, the energy change calculation unit 15 receives the value of the inversion bit (the value before the inversion this time) from the selection circuit unit 2, and calculates $\Delta h_0$ by the expression (4) according to whether the inversion bit is inverted from 1 to 0 or 0 to 1. Then, the energy change calculation unit 15 updates $h_0$ by adding $\Delta h_0$ to the previous $h_0$. The energy change calculation unit 15 includes a register that holds $h_0$ and holds the updated $h_0$ by the register.

Moreover, the energy change calculation unit 15 receives the current own bit from the bit holding unit 14, and calculates the energy change value $\Delta E_0$ of the Ising model of the case where the own bit is inverted from 0 to 1 when the own bit is 0, or from 1 to 0 when the own bit is 1, by the expression (2) The energy change calculation unit 15 outputs the calculated energy change value $\Delta E_0$ to the state transition determination unit 16.

The state transition determination unit 16 outputs a signal $flg_0$ indicating the inversion availability of the own bit according to the energy change calculation by the energy change calculation unit 15 to the selection circuit unit 2. Specifically, the state transition determination unit 16 is a comparator that receives the energy change value $\Delta E_0$ calculated by the energy change calculation unit 15, and determines the inversion availability of the own bit according to comparison of the energy change value $\Delta E_0$ with the threshold generated by the threshold generation unit 3. Here, the determination by the state transition determination unit 16 will be described.

In simulated annealing, it is known that, when an allowable probability p(ΔE, T) of a state transition that causes a certain energy change ΔE is determined as the expression (5) below, the state reaches an optimal solution (ground state) in the limit of the time (the number of iterations) infinity.

[Math. 5]

$$p(\Delta E, T) = f\left(-\frac{\Delta E}{T}\right) \quad (5)$$

In the expression (5), T is the temperature parameter T described above. Here, as a function f, the expression (6) (Metropolis method) or the expression (7) (Gibbs method) is used.

[Math. 6]

$$f_{metro}(x) = \min(1, e^x) \quad (6)$$

[Math. 7]

$$f_{Gibbs}(x) = \frac{1}{1+e^{-x}} \quad (7)$$

The temperature parameter T is expressed by, for example, the expression (8). That is, the temperature parameter T is given by a function that logarithmically decreases with respect to the number of iterations t. For example, a constant c is determined according to the problem.

[Math. 8]

$$T = \frac{T_0 \log(c)}{\log(t+c)} \quad (8)$$

Here, $T_0$ is an initial temperature value, and is desirably a sufficiently large value depending on the problem.

In the case of using the allowance probability $p(\Delta E, T)$ expressed by the expression (5), when a state reaches a steady state after sufficient repetition of the state transition at a certain temperature, the state is generated according to the Boltzmann distribution. That is, an occupancy probability of each state follows the Boltzmann distribution for a thermal equilibrium state in thermodynamics. Therefore, by gradually decreasing the temperature in such a manner that the state following the Boltzmann distribution is generated at a certain temperature, and the state follow the Boltzmann distribution is generated at a temperature lower than the certain temperature, the state following the Boltzmann distribution at each temperature can be achieved. Then, when the temperature is 0, the lowest energy state (ground state) is achieved with a high probability by the Boltzmann distribution at the temperature 0. Since this state is very similar to a state change of when a material is annealed, this method is called simulated annealing. At this time, probabilistic occurrence of a state transition that increases energy corresponds to thermal excitation in physics.

For example, a circuit that outputs a flag (flg=1) indicating allowance of the state transition that causes the energy change $\Delta E$ with the allowance probability $p(\Delta E, T)$ can be implemented by a comparator that outputs a value according to a comparison between $f(-\Delta E/T)$ and a uniform random number u taking a value in an interval [0, 1).

However, the same function can be implemented even when the following modification is made. Applying the same monotonically increasing function to two numbers does not change the magnitude relationship. Therefore, even when the same monotonically increasing function is applied to two inputs of the comparator, the output of the comparator does not change. For example, an inverse function $f^{-1}(-\Delta E/T)$ of $f(-\Delta E/T)$ can be used as the monotonically increasing function applied to $f(-\Delta E/T)$, and $f^{-1}(u)$ in which $-\Delta E/T$ of $f^{-1}(-\Delta E/T)$ is u can be used as the monotonically increasing function applied to the uniform random number u. In that case, a circuit having a similar function to the above-described comparator may be a circuit that outputs 1 when $-\Delta E/T$ is larger than $f^{-1}(u)$. Moreover, since the temperature parameter T is positive, the state transition determination unit 16 may be a circuit that outputs $flg_0=1$ when $-\Delta E$ is larger than $T \cdot f^{-1}(u)$ (or when $\Delta E$ is smaller than $-(T \cdot f^{-1}(u))$).

The threshold generation unit 3 generates the uniform random number u and outputs the value of $f^{-1}(u)$, using a conversion table for conversion to the value of $f^{-1}(u)$ described above. When the Metropolis method is applied, $f^{-1}(u)$ is given by the expression (9). Furthermore, when the Gibbs method is applied, $f^{-1}(u)$ is given by the expression (10).

[Math. 9]

$$f_{metro}^{-1}(u) = \log(u) \quad (9)$$

[Math. 10]

$$f_{Gibbs}^{-1}(u) = \log\left(\frac{u}{1-u}\right) \quad (10)$$

The conversion table is stored in, for example, a memory such as a random access memory (RAM) or a flash memory (not illustrated) connected to the threshold generation unit 3. The threshold generation unit 3 outputs a product $(T \cdot f^{-1}(u))$ of the temperature parameter T and $f^{-1}(u)$ as the threshold. Here, $T \cdot f^{-1}(u)$ corresponds to thermal excitation energy.

Note that, when the selection circuit unit 2 inputs $flg_j$ to the state transition determination unit 16 to indicate that $flg_j$ does not allow the state transition (that is, the state transition does not occur), the state transition determination unit 16 may perform comparison with the threshold after adding an offset value to $-\Delta E_0$. Furthermore, the state transition determination unit 16 may increase the offset value to be added in a case where non-occurrence of the state transition continues. Meanwhile, in a case where $flg_j$ allows the state transition (that is, the state transition occurs), the state transition determination unit 16 sets the offset value to 0. The addition of the offset value to $-\Delta E_0$ or the increase in the offset value enables the state transition to be more easily allowed. In the case where the current state is in a local solution, escape from the local solution is promoted.

In this way, the temperature parameter T is set to be gradually small, and the spin bit string in the case where, for example, the value of the temperature parameter T is set to be small by a predetermined number of times (or the temperature parameter T has reached the minimum value) is held in the bit operation circuits 1a1, ..., and 1aN. The optimization device 1 outputs the spin bit string of the case where the value of the temperature parameter T is set to be small by a predetermined number of times (or the temperature parameter T has reached the minimum value) as the solution.

According to the optimization device 1, the selection circuit unit 2 selects the bit to be inverted in the spin bit string and the energy change value corresponding to the bit on the basis of the signals output from each of the bit operation circuits 1a1, ..., and 1aN. Then, a signal ($q_j$, $flg_j$, index=j) indicating the selected bits is output to each of the bit operation circuits 1a1, ..., and 1aN. A signal indicating the selected energy change value $\Delta E_j$ is output to the energy calculation unit 5.

Thereby, a decrease in operation speed with an increase in circuit scale can be suppressed. Specific description will be given as follows.

For example, a circuit configuration of a comparative example as follows is conceivable. That is, it is conceivable to supply a predetermined command signal for outputting $\Delta E_j$ from the selection circuit unit to the energy change calculation unit of the bit operation circuit corresponding to the index=j after the selection of the inversion bit (index=j) by the selection circuit unit. In this case, the selection circuit unit does not select the energy change value and the selection circuit unit does not supply $\Delta E_j$ to the energy calculation unit. Furthermore, in this case, the $\Delta E_j$ output from the energy change calculation unit is supplied to, for example, a predetermined $\Delta E$ output circuit. The $\Delta E$ output circuit is normally supplied with $\Delta E=0$ from the all the bit operation circuits. The $\Delta E$ output circuit receives $\Delta E_j$ calculated by the energy change calculation unit from the bit operation circuit corresponding to the inversion bit, and outputs $\Delta E_j$ by OR logic or the like. An output destination of $\Delta E_j$ in the $\Delta E$ output circuit is the energy calculation unit.

However, in the case of the circuit configuration of the comparative example using the $\Delta E$ output circuit, a first signal path for supplying the command signal to the bit operation circuit corresponding to the inversion bit from the selection circuit unit and a second signal path for supplying $\Delta E_j$ to the $\Delta E$ output circuit from the energy change calculation unit are required. Therefore, it takes time to transmit a signal via the first signal path and the second signal path. The larger the circuit area of the optimization device, the longer the length of the first signal path and the length of the second signal path. A delay with signal transmission via the first signal path and the second signal path becomes larger as the circuit scale of the optimization device becomes larger and the circuit area becomes larger.

Due to the delay, start of energy calculation by the energy calculation unit is delayed. When the delay in starting the energy calculation becomes excessive, it can become a bottleneck in the operation speed of the optimization device. The optimization device synchronously holds the spin bit string held in the bit holding unit of each bit operation circuit and the energy E for the spin bit string. Therefore, when the calculation of the energy E is delayed, update of the spin bit string by the bit operation circuit is also delayed, and the operation speed of the entire optimization device may decrease.

Therefore, in the optimization device 1, the selection circuit unit 2 selects the inversion bit and also selects the energy change value, and the energy change value $\Delta E_j$ selected by the selection circuit unit 2 is output to the energy calculation unit 5. Thereby, the first signal path and the second signal path in the circuit configuration of the above comparative example become unnecessary, and signal transmission via the first signal path and the second signal path becomes unnecessary. Furthermore, the $\Delta E$ output circuit illustrated in the circuit configuration of the comparative example is also unnecessary. Therefore, the delay with the signal transmission is reduced, and the energy calculation by the energy calculation unit 5 can be started earlier than the circuit configuration of the comparative example. As a result, the decrease in the operation speed with the increase in the circuit scale of the optimization device 1 can be suppressed.

Hereinafter, an information processing system using the optimization device 1 will be illustrated, and the functions of the optimization device 1 will be described in more detail.

Second Embodiment

Next, a second embodiment will be described.

Figure 2:
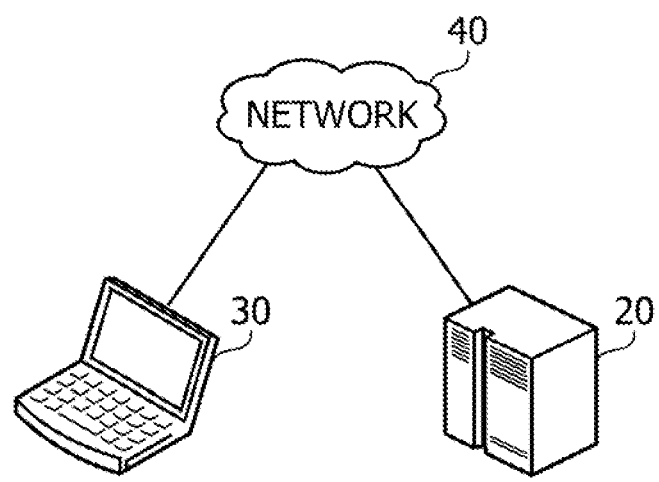
FIG. 2 is a diagram illustrating an example of an information processing system according to a second embodiment.

FIG. 2 is a diagram illustrating an example of an information processing system according to the second embodiment.

The information processing system of the second embodiment includes an information processing device 20 and a client 30. The information processing device 20 and the client 30 are connected to a network 40. The network 40 may be, for example, a local area network (LAN), a wide area network (WAN), the Internet, or the like.

The information processing device 20 provides a function to replace a combinatorial optimization problem with an Ising model and solve the combinatorial optimization problem at high speed by searching for a ground state of the Ising model.

The client 30 is a client computer used by a user, and is used for inputting a problem to be solved by the user to the information processing device 20.

Figure 3:
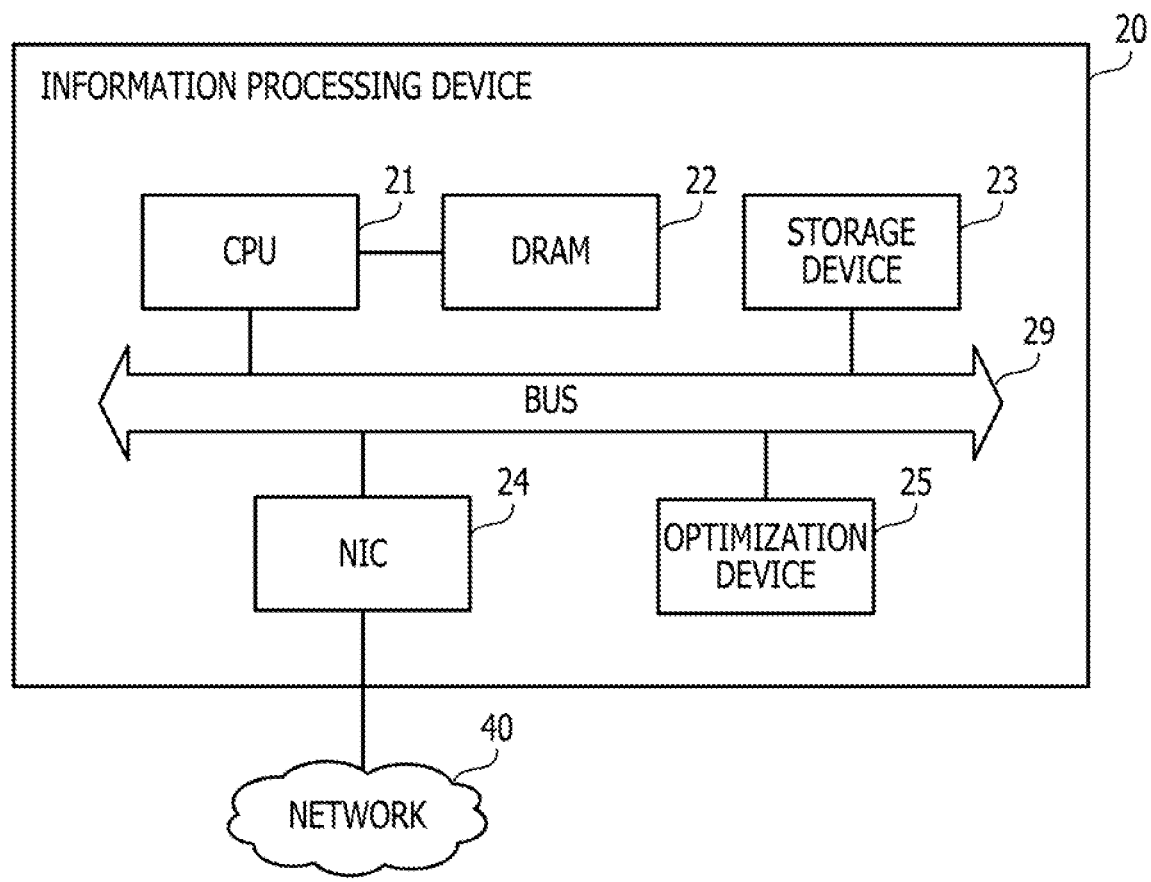
FIG. 3 is a block diagram illustrating a hardware example of an information processing device.

FIG. 3 is a block diagram illustrating a hardware example of the information processing device.

The information processing device 20 includes a central processing unit (CPU) 21, a dynamic random access memory (DRAM) 22, a storage device 23, a network interface card (NIC) 24, and an optimization device 25. The CPU 21, DRAM 22, storage device 23, NIC 24, and optimization device 25 are connected to a bus 29 of the information processing device 20. The bus 29 is, for example, a peripheral component interconnect express (PCIe) bus.

The CPU 21 is a processor that executes instructions of a program stored in the DRAM 22. The CPU 21 loads the program and at least a part of data stored in the storage device 23 to the DRAM 22, and executes the program. The CPU 21 controls settings and operations of the optimization device 25 by a function exhibited by executing the program.

The DRAM 22 is a main storage device of the information processing device 20, and temporarily stores the program executed by the CPU 21 and data or the like set in the optimization device 25.

The storage device 23 is an auxiliary storage device of the information processing device 20, and stores the program executed by the CPU 21 and data or the like set in the optimization device 25. The storage device 23 is, for example, a solid state drive (SSD), a hard disk drive (HDD), or the like.

The NIC 24 is a communication interface that is connected to the network 40 and communicates with the client 30 via the network 40. The NIC 24 is connected to, for example, communication devices such as a switch and a router belonging to the network 40 via a cable.

The optimization device 25 searches for the ground state of the Ising model under the control of the CPU 21. The optimization device 25 is, for example, a one-chip semiconductor integrated circuit, and is implemented by an FPGA or the like. The optimization device 25 is an example of the optimization device 1 according to the first embodiment.

Note that the client 30 includes a CPU, a main storage device, an auxiliary storage device, and a NIC.

Figure 4:
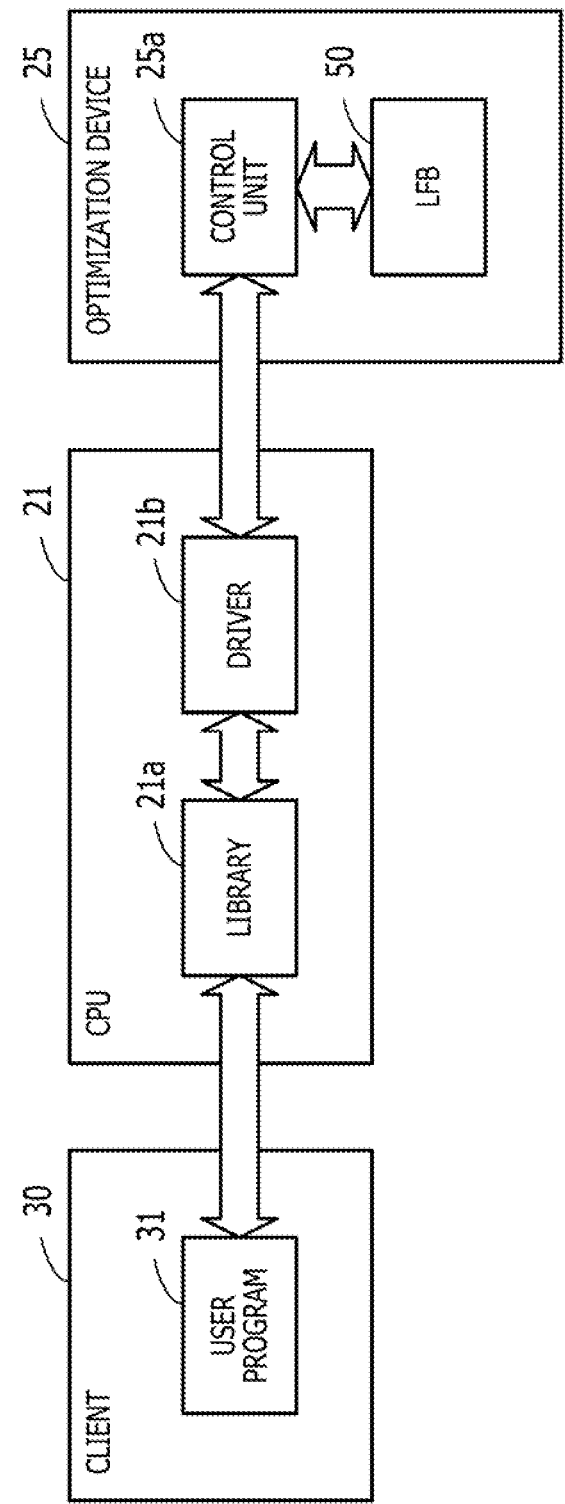
FIG. 4 is a diagram illustrating an example of a relationship of hardware in the information processing system.

FIG. 4 is a diagram illustrating an example of a relationship of hardware in the information processing system.

The client 30 executes a user program 31. The user program 31 inputs various data (for example, operating conditions such as content of a problem to be solved and a use schedule of the optimization device 25) to the information processing device 20, and displays an operation result by the optimization device 25.

The CPU 21 is a processor (operation unit) that executes a library 21a and a driver 21b. A program of the library 21a and a program of the driver 21b are stored in the storage device 23 and are loaded into the DRAM 22 when executed by the CPU 21.

The library 21a receives various data input by the user program 31 and converts the problem to be solved by the user into a problem for searching for the lowest energy state of the Ising model. The library 21a provides the driver 21b with information regarding the converted problem (for example, the number of spin bits, the number of bits representing weight coefficients, values of the weight coefficients, an initial value of a temperature parameter, and the like). Furthermore, the library 21a acquires the search result of the solution by the optimization device 25 from the driver 21b, converts the search result into result information easy to understand by the user (for example, information on a result display screen), and provides the search result to the user program 31.

The driver 21b supplies the information provided by the library 21a to the optimization device 25. Furthermore, the driver 21b acquires the search result of the solution by the Ising model from the optimization device 25 and provides the search result to the library 21a.

The optimization device 25 includes a control unit 25a and a local field block (LFB) 50 as hardware.

The control unit 25a includes a RAM for storing an operating condition of the LFB 50 received from the driver 21b, and controls the operation by the LFB 50 on the basis of the operating condition. Furthermore, the control unit 25a sets initial values in various registers provided in the LFB 50, stores the weight coefficients in the SRAM, and reads a spin bit string (search result) after the operation is completed, for example. The control unit 25a is implemented by, for example, a circuit or the like in an FPGA.

The LFB 50 includes a plurality of local field elements (LFEs). The LFE is a unit element corresponding to a spin bit. One LFE corresponds to one spin bit. As will be described below, the optimization device 25 may include a plurality of LFBs.

Figure 5:
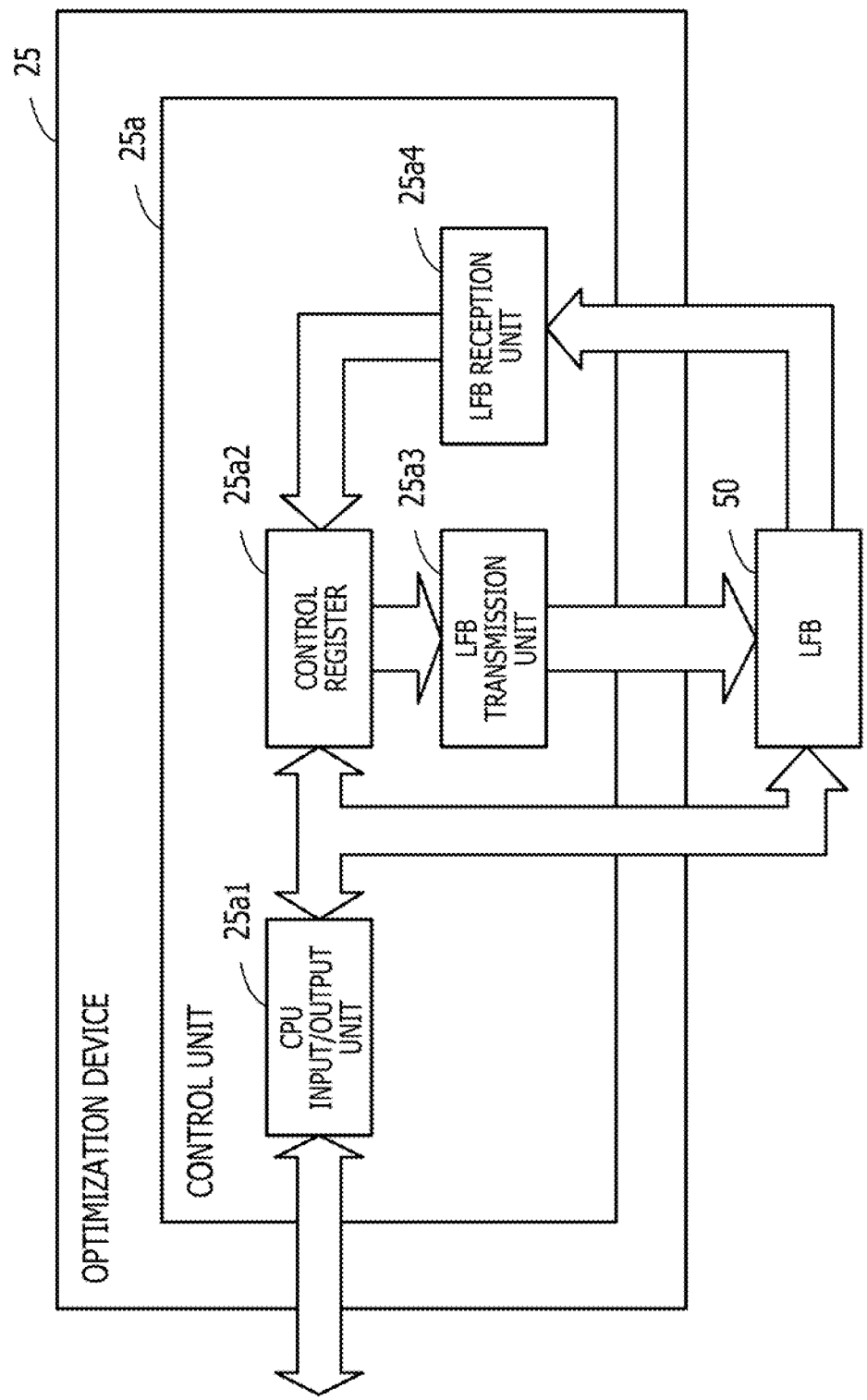
FIG. 5 is a block diagram illustrating a hardware example of a control unit.

FIG. 5 is a block diagram illustrating a hardware example of the control unit.

The control unit 25a includes a CPU input/output unit 25a1, a control register 25a2, an LFB transmission unit 25a3, and an LFB reception unit 25a4.

The CPU input/output unit 25a1 inputs the data received from the CPU 21 to the control register 25a2 or the LFB 50. For example, the CPU input/output unit 25a1 can input setting data such as initial values of parameters and a coupling constant input by the CPU 21, and the operating condition data of the LFB 50 to the LFB 50 via the control register 25a2, and can input the data to each register or RAM in the LFB 50.

The control register 25a2 holds the various setting data for the LFB 50 by the CPU input/output unit 25a1 and outputs the setting data to the LFB transmission unit 25a3. Furthermore, the control register 25a2 holds the data received from the LFB 50 by the LFB reception unit 25a4 and outputs the data to the CPU input/output unit 25a1.

The LFB transmission unit 25a3 transmits the setting data held in the control register 25a2 to the LFB 50.

The LFB reception unit 25a4 receives the data (such as the operation result) from the LFB 50 and stores the data in the control register 25a2.

Figure 6:
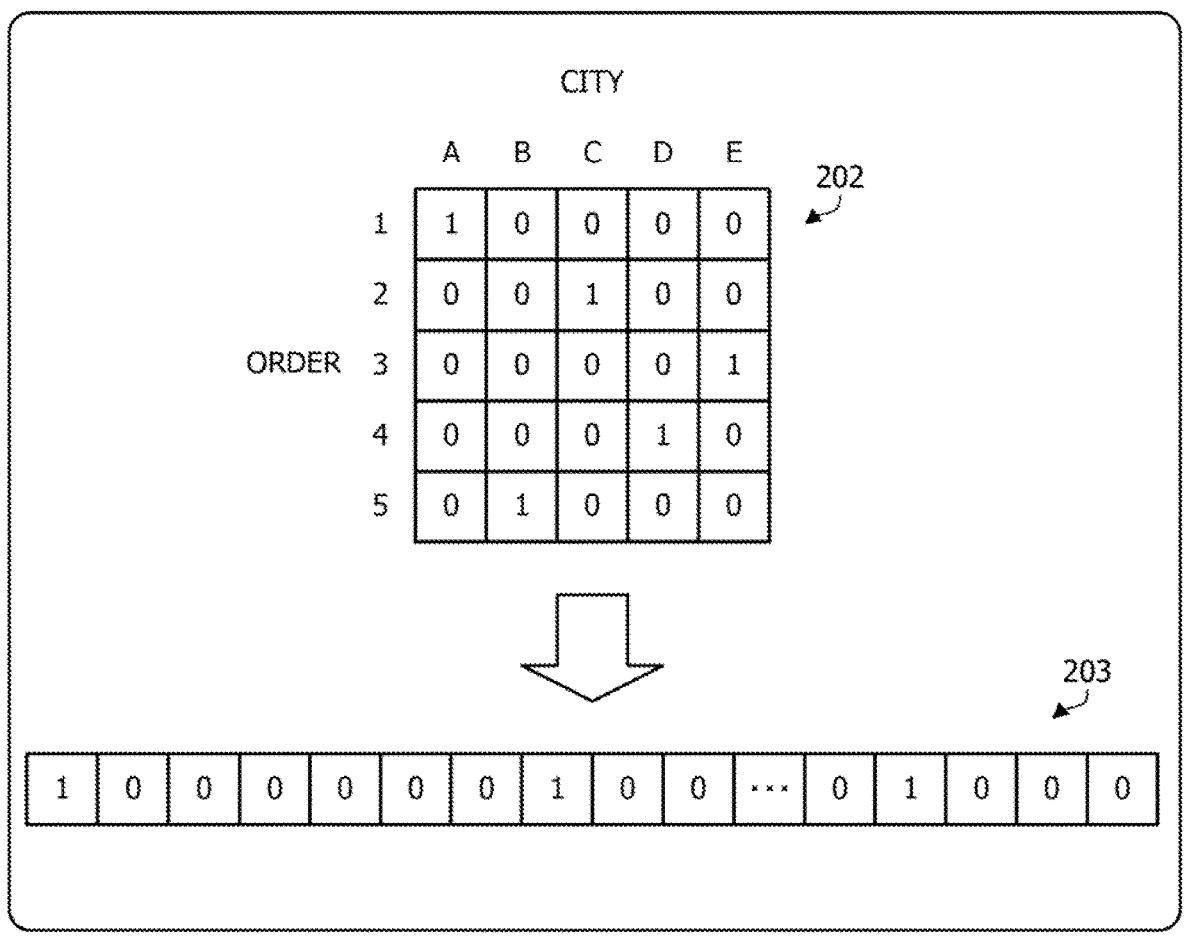
FIG. 6 is a diagram illustrating an example of a combinatorial optimization problem.

FIG. 6 is a diagram illustrating an example of the combinatorial optimization problem.

As an example of the combinatorial optimization problem, consider a traveling salesman problem. Here, for the sake of simplicity, it is assumed to find a route to go around five cities of A city, B city, C city, D city, and E city at the lowest cost (distance, fee, or the like). Graph 201 illustrates one route having the cities as nodes and movements between the cities as edges. This route is expressed by, for example, a matrix 202 in which rows correspond to the order to go around, and columns corresponds to the cities. The matrix 202 indicates that a salesman moves to the city to which the bit "1" is set in ascending order of rows. Moreover, the matrix 202 can be converted to a binary value 203 corresponding to a spin bit string. In the example of the matrix 202, the binary value 203 is 5×5=25 bits. The number of bits of the binary value 203 (spin bit string) increases as the number of cities to travel increases. That is, as the scale of the combinatorial optimization problem increases, more spin bits are required, and the number of bits (scale) of the spin bit string increases.

Next, a search example for a binary value that is the minimum energy.

Figure 7:
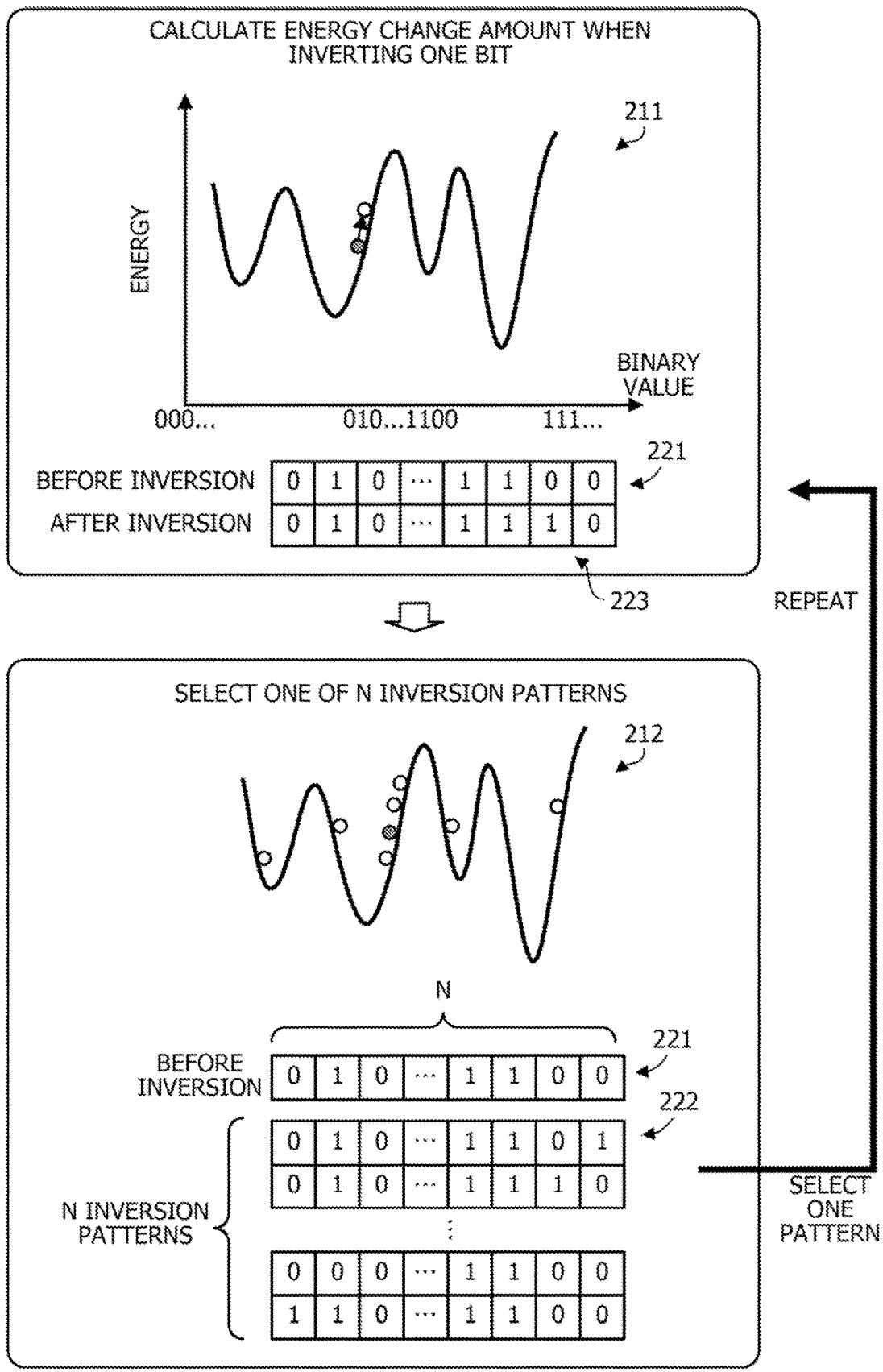
FIG. 7 is a diagram illustrating a search example for a binary value that is minimum energy.

FIG. 7 is a diagram illustrating a search example for a binary value that is minimum energy.

First, the energy before inverting one bit (before spin inversion) of a binary value 221 is $E_{init}$.

The optimization device 25 calculates an energy change amount $\Delta E$ when inverting any one bit of the binary value 221. Graph 211 illustrates the energy change with respect to one-bit inversion according to an energy function, where the horizontal axis represents the binary value and the vertical axis represents the energy. The optimization device 25 obtains $\Delta E$ by the expression (2).

The optimization device 25 applies the above calculation to all the bits of the binary value 221, and calculates the energy change amount $\Delta E$ for the inversion of each of the bits. For example, when the number of bits of the binary value 221 is N, the number of inversion patterns 222 is N. Graph 212 illustrates a state of the energy change for each inversion pattern.

The optimization device 25 randomly selects one of the inversion patterns 222 that satisfy an inversion condition (a predetermined determination condition between a threshold and $\Delta E$) on the basis of $\Delta E$ for each inversion pattern. The optimization device 25 adds/subtracts $\Delta E$ corresponding to the selected inversion pattern to/from $E_{init}$ before spin inversion to calculate the energy value E after spin inversion. The optimization device repeats the above procedure using the obtained energy value E as $E_{init}$ and the binary value 223 after spin inversion.

Here, as described above, one element of W used in the expressions (2) and (3) is a spin inversion weight coefficient indicating the magnitude of an interaction between bits. The number of bits representing the weight coefficient is called precision. The conditions for the energy change amount $\Delta E$ at the time of spin inversion can be set in more details as the precision is higher. For example, the total size of W is "the precision×the number of spin bits×the number of spin bits" for all of couplings of two bits contained in the spin bit string. As an example, in the case where the number of spin bits is 1 k (=1024), the total size of W is "precision×1 k×1 k" bits.

Figure 8:
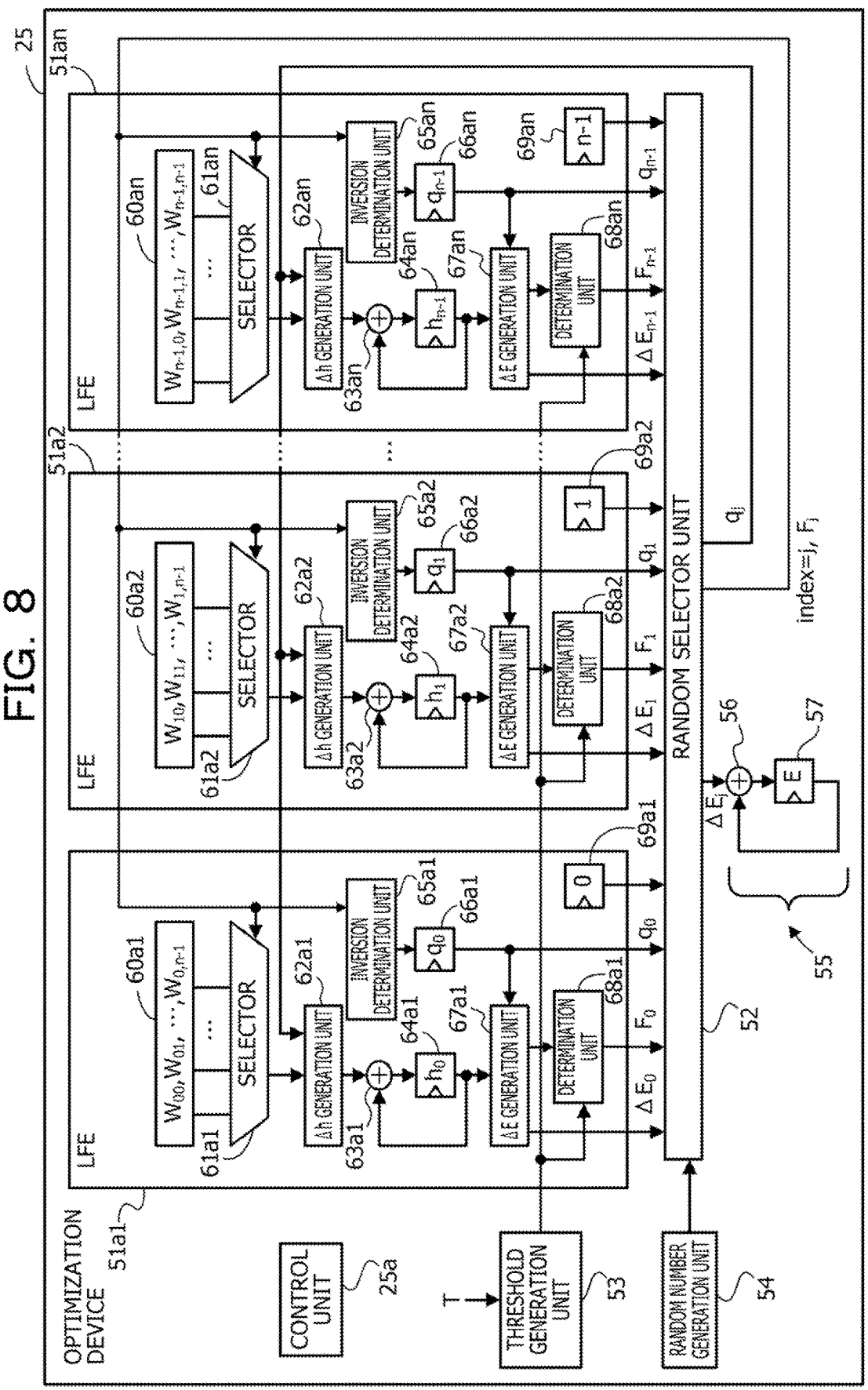
FIG. 8 is a diagram illustrating a circuit configuration example of the optimization device.

Next, a circuit configuration of the optimization device 25 that performs the search illustrated in FIG. 7 will be described, FIG. 8 is a diagram illustrating a circuit configuration example of the optimization device.

The optimization device 25 (or the LFB 50 of the optimization device 25) includes LFEs 51a1, 51a2, ..., and 51an, a random selector unit 52, a threshold generation unit 53, a random number generation unit 54, and an energy calculation unit 55.

Each of the LFEs 51a1, 51a2, ..., and 51an is used as one bit of the spin bit. n is an integer of 2 or larger and represents the number of LFEs included in the LFB 50. Identification information (index) of the LFE is associated with each of the LFEs 51a1, 51a2, ..., and 51an. The index=0, 1, ..., or n–1 for each of the LFEs 51a1, 51a2, ..., and 51an. The LFEs 51a1, 51a2, ..., and 51an are examples of the bit operation circuits 1a1, ..., and 1aN in the first embodiment.

Hereinafter, the circuit configuration of the LFE 51a1 will be described. The LFEs 51a2, ..., and 51an are also implemented with a circuit configuration similar to the LFE 51a1. Regarding description of the circuit configurations of the LFEs 51a2, ..., and 51an, the "a1" part at the end of the reference sign of the element in the following description is replaced respectively with "a2", ..., and "an" (for example, the reference sign of "60a1" is replaced with "60an"). Furthermore, the subscripts of each of the values such as h, q, ΔE, and W may be replaced respectively with subscripts corresponding to "a2", ..., and "an".

The LFE 51a1 includes an SRAM 60a1, a selector 61a1, a Δh generation unit 62a1, an adder 63a1, an h storage register 64a1, an inversion determination unit 65a1, a bit storage register 66a1, a ΔE generation unit 67a1, a determination unit 68a1, and an index storage register 69a1.

The SRAM 60a1 stores the weight coefficients W. The SRAM 60a1 corresponds to the storage unit 11 of the first embodiment. The SRAM 60a1 stores only the weight coefficients W used by the LFE 51a1, of all the weight coefficients W of all the spin bits. Therefore, when the number of spin bits is n (n is an integer of 2 or larger), the size of the total weight coefficients stored in the SRAM 60a1 is "precision×n" bits. Furthermore, the weight coefficients $W_{00}$, $W_{01}$, ..., and $W_{0,n-1}$ are stored in the SRAM 60a1.

The selector 61a1 acquires the index that is identification information of an inversion bit and a flag F indicating inversion being available from the random selector unit 52, and reads the weight coefficient corresponding to the inversion bit from the SRAM 60a1. The selector 61a1 outputs the read weight coefficient to the Δh generation unit 62a1.

The Δh generation unit 62a1 receives the current bit value of the inversion bit (bit value before the inversion this time) from the random selector unit 52, and calculates a change amount $\Delta h_0$ of a local field h0 by the expression (4) using the weight coefficient acquired from the selector 61a1. The Δh generation unit 62a1 outputs $\Delta h_0$ to the adder 63a1.

The adder 63a1 adds $\Delta h_0$ to the local field $h_0$ stored in the h storage register 64a1 and outputs the local field $h_0$ to the h storage register 64a1.

The h storage register 64a1 takes in the value (the local field $h_0$) output by the adder 63a1 in synchronization with a clock signal (not illustrated). The h storage register 64a1 is, for example, a flip-flop. Note that an initial value of the local field $h_0$ stored in the h storage register 64a1 is a bias coefficient $b_0$. The initial value is set by the control unit 25a.

The inversion determination unit 65a1 receives the index=j of the inversion bit and the flag $F_j$ indicating the inversion availability from the random selector unit 52, and determines whether the own bit has been selected as the inversion bit. In a case where the own bit has been selected as the inversion bit, the inversion determination unit 65a1 inverts the spin bit stored in the bit storage register 66a1.

The bit storage register 66a1 holds the spin bit corresponding to the LFE 51a1. The bit storage register 66a1 is, for example, a flip-flop. The spin bit stored in the bit storage register 66a1 is inverted by the inversion determination unit 65a1. The bit storage register 66a1 outputs spin bit to the ΔE generation unit 67a1 and the random selector unit 52.

The ΔE generation unit 67a1 calculates an energy change amount $\Delta E_0$ of the Ising model according to the inversion of the own bit by the expression (2) on the basis of the local field $h_0$ of the h storage register 64a1 and the spin bit of the bit storage register 66a1. The ΔE generation unit 67a1 outputs the energy change amount $\Delta E_0$ to the determination unit 68a1 and the random selector unit 52.

The determination unit 68a1 outputs a flag $F_0$ indicating whether to allow the inversion of the own bit (indicating the inversion availability of the own bit) to the random selector unit 52 by comparing the energy change amount $\Delta E_0$ output by the ΔE generation unit 67a1 and the threshold generated by the threshold generation unit 53. Specifically, the determination unit 68a1 outputs $F_0=1$ (inversion available) when $\Delta E_0$ is smaller than the threshold value $-(T \cdot f^{-1}(u))$, and outputs $F_0=0$ (inversion unavailable) when $\Delta E_0$ is equal to or larger than the threshold value $-(T \cdot f^{-1}(u))$. Here, $f^{-1}(u)$ is a function given in either the expression (9) or (10) according to an applicable law. Furthermore, u is a uniform random number in the interval [0,1).

The index storage register 69a1 outputs the index=0 of the LFE 51a1 to the random selector unit 52 in synchronization with a clock signal (not illustrated). The index storage register 69a1 is, for example, a flip-flop.

The random selector unit 52 receives the spin bit, the flag indicating inversion availability of the spin bit, the index, and the energy change amount from each of the LFEs 51a1, 51a2, ..., and 51an. The random selector unit 52 selects the bit to be inverted (inversion bit) from the invertible spin bits. Furthermore, the random selector unit 52 selects the energy change value corresponding to the inversion bit together with the inversion bit.

The random selector unit 52 supplies the current bit value (bit $q_j$) of the selected inversion bit to the Δh generation units 62a1, 62a2, ..., and 62an included in the LFEs 51a1, 51a2, ..., and 51an. The random selector unit 52 is an example of the selection circuit unit 2 of the first embodiment.

The random selector unit 52 supplies the index=j of the inversion bit and the flag $F_j$ indicating the inversion availability to the selectors 61a1, 61a2, ..., and 60an and the inversion determination units 65a1, 65a2, ..., and 65an included in the LFEs 51a1, 51a2, ..., and 51an.

Moreover, the random selector unit 52 supplies $\Delta E_j$ corresponding to the selected inversion bit to the energy calculation unit 55.

The threshold generation unit 53 generates and supplies the threshold to be used for comparison with the energy change amount ΔE to the determination units 68a1, 68a2, ..., and 68an included in the LFEs 51a1, 51a2, ..., and 51an. As described above, the threshold generation unit 53 generates the threshold using the temperature parameter T, the uniform random number u in the interval [0,1), and $f^{-1}(u)$ illustrated in the expression (9) or (10). The threshold generation unit 53 individually includes a random number generation unit for each LFE, for example, and generates the threshold individually using the random number u for each LFE. Note that the random number generation unit may be shared by some LFEs. The initial value of the temperature parameter T and a decrease cycle, a decrease amount of the temperature parameter T in the simulated annealing, and the like are controlled by the control unit 25a.

The random number generation unit 54 generates a random number bit to be used for selecting the inversion bit in the random selector unit 52, and supplies the random number bit to the random selector unit 52.

The energy calculation unit 55 calculates the energy of the Ising model for the current spin bit string. The energy calculation unit 55 includes an adder 56 and an E storage register 57.

The adder 56 receives the energy change amount $\Delta E_j$ output by the random selector unit 52 and adds $\Delta E_j$ to the energy value E stored in the E storage register 57, and outputs the energy value E to the E storage register 57.

The E storage register 57 takes in the energy value E output by the adder 56 in synchronization with a clock signal (not illustrated). The E storage register 57 is, for example, a flip-flop. Note that the initial value of the energy value E is calculated by the control unit 25a using the expression (1) according to the initial value of the spin bit string and set in the E storage register 57. The E storage register 57 holds the energy value E synchronized with the spin bit string held by the LFEs 51a1, . . . , and 51an.

Here, the energy value E stored in the E storage register 57 is read by the control unit 25a together with, for example, the spin bit string. For example, it is conceivable that the control unit 25a implements a plurality of replicas of a certain Ising model by using a plurality of LFB 50s, accelerates convergence of a solution, and speeds up the operation by a method called replica exchange method.

In the replica exchange method, a different temperature parameter T is given to each replica and a solution is searched for, and the temperatures between the replicas are exchanged based on the energy value E and an exchange probability based on the temperature parameter T. In this case, the control unit 25a reads the minimum energy implemented by each replica and the spin bit string at that time from the E storage register and the bit storage register in the LFB belonging to the replica and store the read data in the RAM of the control unit 25a in the process of searching for the solution. When the minimum energy is updated, the control unit 25a updates the stored minimum energy and spin bit string. It is conceivable that the control unit 25a adopts the spin bit string to which the minimum energy is given by a predetermined number of trials as the solution. Note that a plurality of optimization devices 25 may be provided in the information processing device 20, and the CPU 21 may control the above operation by the replica exchange method for the plurality of replicas implemented by the plurality of optimization devices 25 (may exchange temperatures between replicas and specify the spin bit string giving the minimum energy).

Alternatively, the energy value E stored in the E storage register 57 may be used for verification of the operating conditions of the optimization device 25 by the library 21a or the like.

Figure 9:
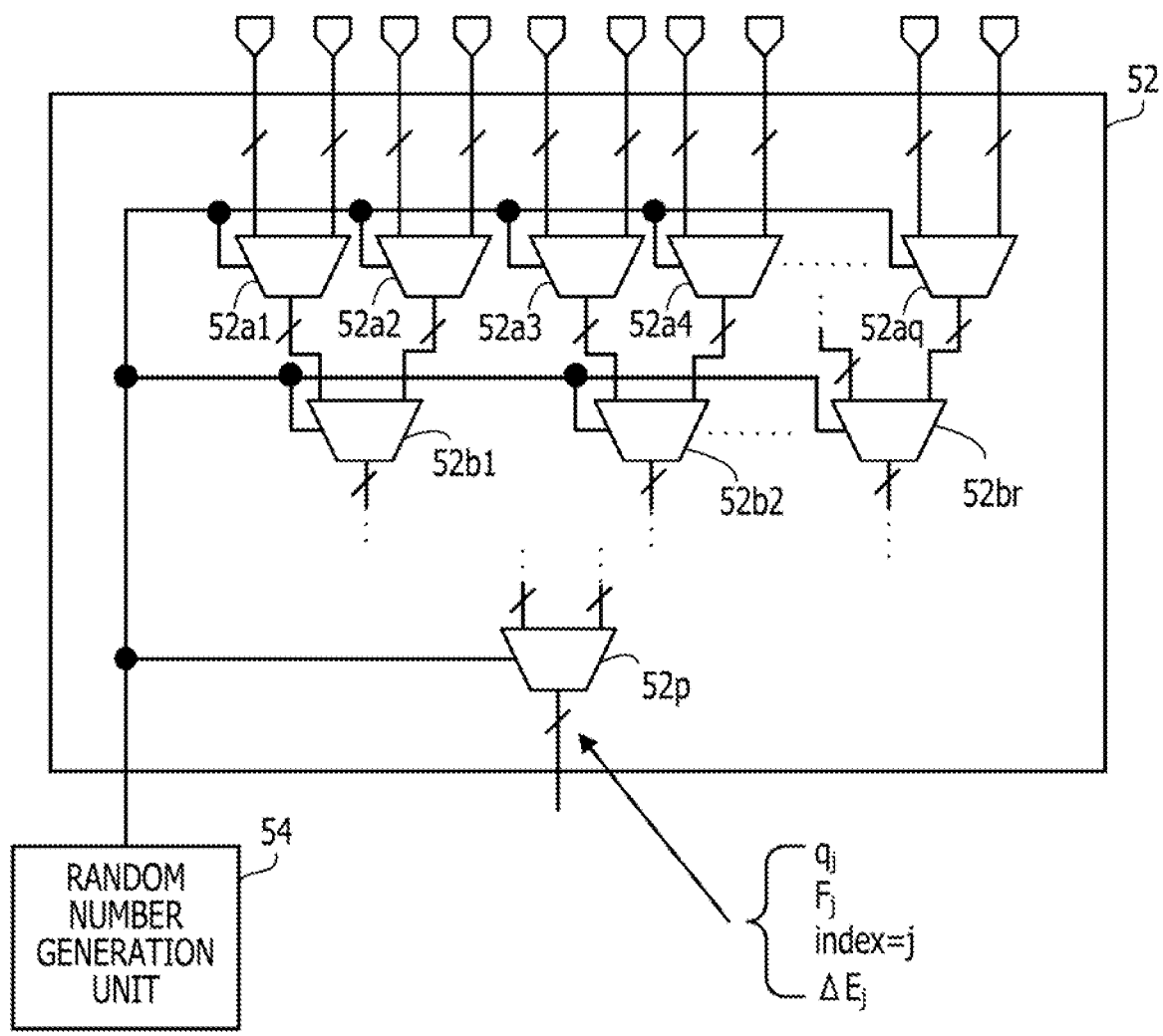
FIG. 9 is a diagram illustrating a circuit configuration example of a random selector unit.

FIG. 9 is a diagram illustrating a circuit configuration example of the random selector unit.

The random selector unit 52 includes a plurality of selection circuits connected in a tree shape over a plurality of stages.

Two sets of variables $q_i$, $F_i$, index=i, and $\Delta E_i$ (each set is referred to as state signal) output by two of the LFEs 51a1, 51a2, . . . , and 51an are input to each of the selection circuits 52a1, 52a2, 52a3, 52a4, . . . , and 52aq in the first stage. For example, a set of variables $q_0$, $F_0$, index=0 and $\Delta E_0$ output by the LFE 51a1 and a set of variables $q_1$, $F_1$, index=1 and $\Delta E_1$ output by the LFE 51a2 are input to the selection circuit 52a1. Furthermore, a set of variables $q_2$, $F_2$, index=2, and $\Delta E_2$ and a set of variables $q_3$, $F_3$, index=3, and $\Delta E_3$ are input to the selection circuit 52a2. A set of variables $q_4$, $F_4$, index=4, and $\Delta E_4$ and a set of variables $q_5$, $F_5$, index=5, and $\Delta E_5$ are input to the selection circuit 52a3. Moreover, a set of variables $q_6$, $F_6$, index=6, and $\Delta E_6$ and a set of variables $q_7$, $F_7$, index=7, and $\Delta E_7$ are input to the selection circuit 52a4. A set of variables $q_{n-2}$, $F_{n-2}$, index=n−2, and $\Delta E_{n-2}$ and a set of variables $q_{n-1}$, $F_{n-1}$, index=n−1, and $\Delta E_{n-1}$ are input the selection circuit 52aq.

Then, each of the selection circuits 52a1, . . . , and 52aq selects one set of variables $q_i$, $F_i$, index=i, and $\Delta E_i$ on the basis of the input two sets of variables $q_i$, $F_i$, index=i and $\Delta E_i$, and the 1-bit random number output by the random number generation unit 54. At this time, each of the selection circuits 52a1, . . . , and 52aq preferentially selects the set having $F_i$ of 1, or selects any one set on the basis of the 1-bit random number in a case where both the sets have $F_i$ of 1 (which similarly applies to the other selection circuits). Here, the random number generation unit 54 individually generates the 1-bit random number for each selection circuit and supplies the 1-bit random number to each selection circuit. Note that the number of selection circuits 52a1 to 52aq in the first stage is ½ of the number of the LFEs 51a1, . . . , and 51an, that is, n/2.

Two state signals output by the selection circuits 52a1, . . . , and 52aq are input to each of the selection circuits 52b1, 52b2, . . . , and 52br in the second stage. For example, the state signals output by the selection circuits 52a1 and 52a2 are input to the selection circuit 52b1. Furthermore, the state signals output by the selection circuits 52a3 and 52a4 are input to the selection circuit 52b2.

Then, each of the selection circuits 52b1, . . . , and 52br selects one of the two state signals on the basis of the two state signals and the 1-bit random number output by the random number generation unit 54.

Similar processing is performed in the selection circuits in the third and subsequent stages. The selection circuit 52p in the last stage outputs the state signal (the set of $F_j$, $q_j$, index=j, and $\Delta E_j$) that is the output of the random selector unit 52.

In this way, the random selector unit 52 includes a plurality of first selection circuits (selection circuits 52a1, . . . , and 52aq) in the first stage and one or more second selection circuits (selection circuits 52b1, . . . , and 52p) in the second and subsequent stages. Each of the plurality of first selection circuits receives a plurality of sets of the signal (F) indicating inversion availability of the spin bit and the signal (ΔE) indicating the energy change value, and selects and outputs any one set, giving priority to a set including the first signal indicating inversion is available. Each of one or more second selection circuits receives a plurality of sets of the first signal and the second signal output by the plurality of selection circuits in the previous stage, and selects and outputs any one set giving priority to a set including the first signal indicating inversion is available. As the number of sets of the signal indicating inversion availability and the signal indicating the energy change value to be input to each selection circuit unit, two sets are illustrated, but three or more sets may be used.

Each of LFEs 51a1, . . . , and 51an further outputs a signal indicating the value (q) of its own bit. The random selector unit 52 selects the value of the spin bit to be inverted together with the energy change value on the basis of the signal indicating the value of the own bit. Furthermore, each of the LFEs 51a1, . . . , and 51an further outputs a signal indicating the identification information (index) of the each LFE. The random selector unit 52 selects the identification information of the LFE corresponding to the spin bit to be inverted together with the energy change value on the basis of the signal indicating the identification information.

Next, a circuit configuration example of the selection circuits 52a1, . . . , 52aq, and 52b1, . . . , 52br, . . . , and 52p will be described. The selection circuit 52a1 will be mainly described, but the selection circuits 52aq, and 52b1, . . . , 52br, . . . , and 52p have a similar circuit configuration.

Figure 10:
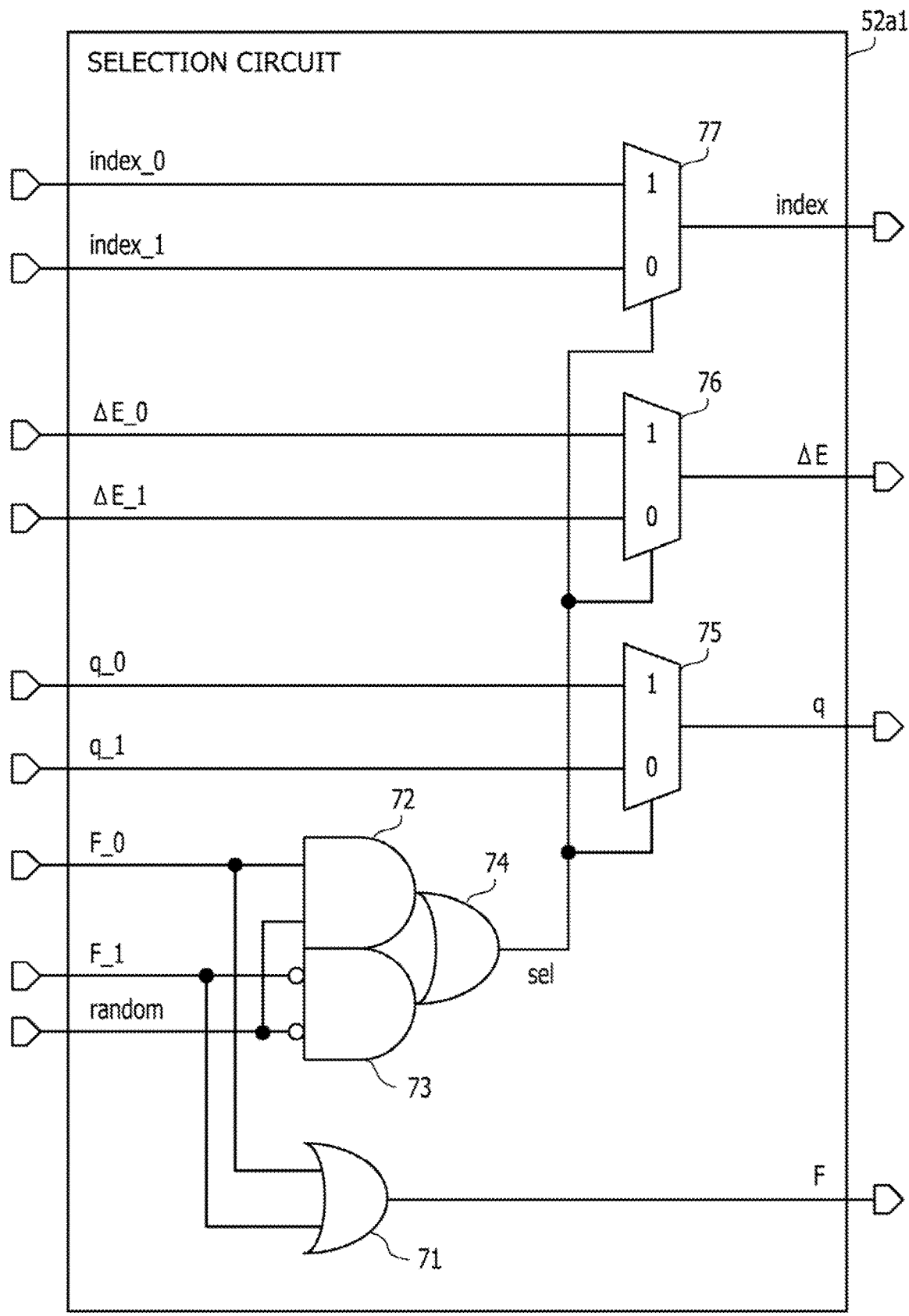
FIG. 10 is a diagram illustrating a circuit configuration example of a selection circuit.

FIG. 10 is a diagram illustrating a circuit configuration example of the selection circuit.

The selection circuit 52a1 includes an OR circuit 71, AND circuits 72 and 73, an OR circuit 74, and selectors 75, 76, and 77.

Here, a state signal (index_0, $\Delta$E_0, q_0, F_0) and a state signal (index_1, $\Delta$E_1, q_1, F_1) are input to the selection circuit 52a1. An output of the selection circuit 52a1 is the state signal (index, $\Delta$E, q, F) of either one of the two state signals.

Flags F_0 and F_1 are input to the OR circuit 71. The OR circuit 71 outputs F=1 when at least one of the F_0 and F_1 is 1, and outputs F=0 when both the F_0 and F_1 are 0.

The flag F_0 and the 1-bit random number (denoted as "random" in FIG. 10) are input to the AND circuit 72. The 1-bit random number is supplied by the random number generation unit 54. The AND circuit 72 outputs 1 when both the flag F_0 and the 1-bit random number are 1, and outputs 0 when at least one of the flag F_0 and the 1-bit random number is 0.

An inverted value of the flag F_1 and an inverted value of the 1-bit random number are input to the AND circuit 73. Here, the inverted value of 0 is 1, and the inverted value of 1 is 0. The AND circuit 73 outputs 1 when both the inverted value of the flag F_1 and the inverted value of the 1-bit random number are 1, and outputs 0 when at least one of the inverted value of the flag F_1 and the inverted value of the 1-bit random number is 0.

Signals from the AND circuits 72 and 73 are input to the OR circuit 74. sel=1 is output when at least one of the outputs of the AND circuits 72 and 73 is 1, and sel=0 is output when both the outputs of the AND circuits 72 and 73 are 0.

q_0, q_1, and sel are input to the selector 75. The selector 75 outputs the spin bit q_0 when the sel=1, and outputs the spin bit q_1 when the sel=0.

$\Delta$E_0, $\Delta$E_1, and sel are input to the selector 76. The selector 76 outputs the energy change value $\Delta$E_0 when the sel=1, and outputs the energy change value $\Delta$E_1 when the sel=0.

index_0, index_1, and sel are input to the selector 77. The selector 77 outputs the index_0 when the sel=1, and outputs the index_1 when the sel=0.

According to the AND circuit 72 and 73 and the OR circuit 74, when both the flags F_0 and F_1 are 1, the q, index, and $\Delta$E corresponding to either of the flags F_0 and F_1 are selected according to the 1-bit random number. Furthermore, when either one of the flags F_0 and F_1 is 1, the q, index, and $\Delta$E corresponding to the flag of 1 are selected. Moreover, when both the flags F_0 and F_1 are 0, the output flag F=0, and the q, index, and $\Delta$E are selected according to the 1-bit random number.

Note that, in the above example, the index being supplied from each LFE has been described, but the index may be generated by the random selector unit 52. For example, each selection circuit of the random selector unit 52 generates an identification value indicating which of the two state signals that are the sets of the variables $q_i$, $F_i$, and $\Delta E_i$ is selected, and adopts the identification value as the index. The selection circuit in the first stage generates a 1-bit identification value, and the selection circuit in the subsequent stage adds 1 bit to the selection circuit in the previous stage to update the identification value. In this way, the binary identification value output by the selection circuit in the final stage may be supplied to each LFE as the index. In the case where the index is generated by the random selector unit 52, each LFE does not have to have the index storage register.

Next, a processing procedure of the optimization device 25 will be described. First, an example of initialization processing of the optimization device 25 will be described.

Figure 11:
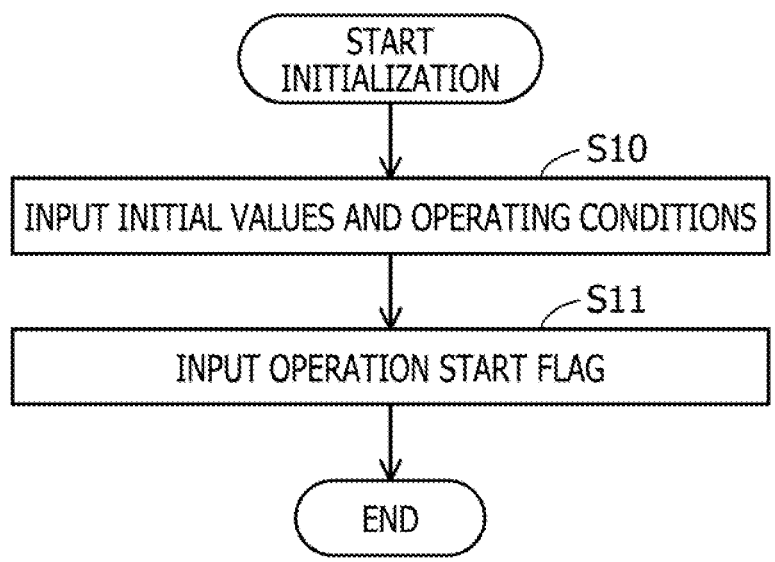
FIG. 11 is a flowchart illustrating an example of initialization processing.

FIG. 11 is a flowchart illustrating an example of the initialization processing.

(S10) The CPU 21 inputs the initial values and operating conditions according to the problem to the optimization device 25. The initial values include, for example, the energy value E, the local field $h_i$, the spin bit $q_i$, the initial value of the temperature parameter T, the weight coefficients W, and the like. Furthermore, the operating conditions include the number of update times N1 of the state with one temperature parameter, the number of change times N2 of the temperature parameter, a range of reduction of the temperature parameter, and the like. The control unit 25a sets the input initial values and the weight coefficients W in the registers and SRAMs of each LFE described above.

(S11) The CPU 21 inputs an operation start flag (for example, an operation start flag=1) to the optimization device 25. The control unit 25a receives the input of the operation start flag and starts the operation by the LFB 50. In this way, the initialization processing is completed, FIG. 12 is a flowchart illustrating an example of operation processing.

Figure 12:
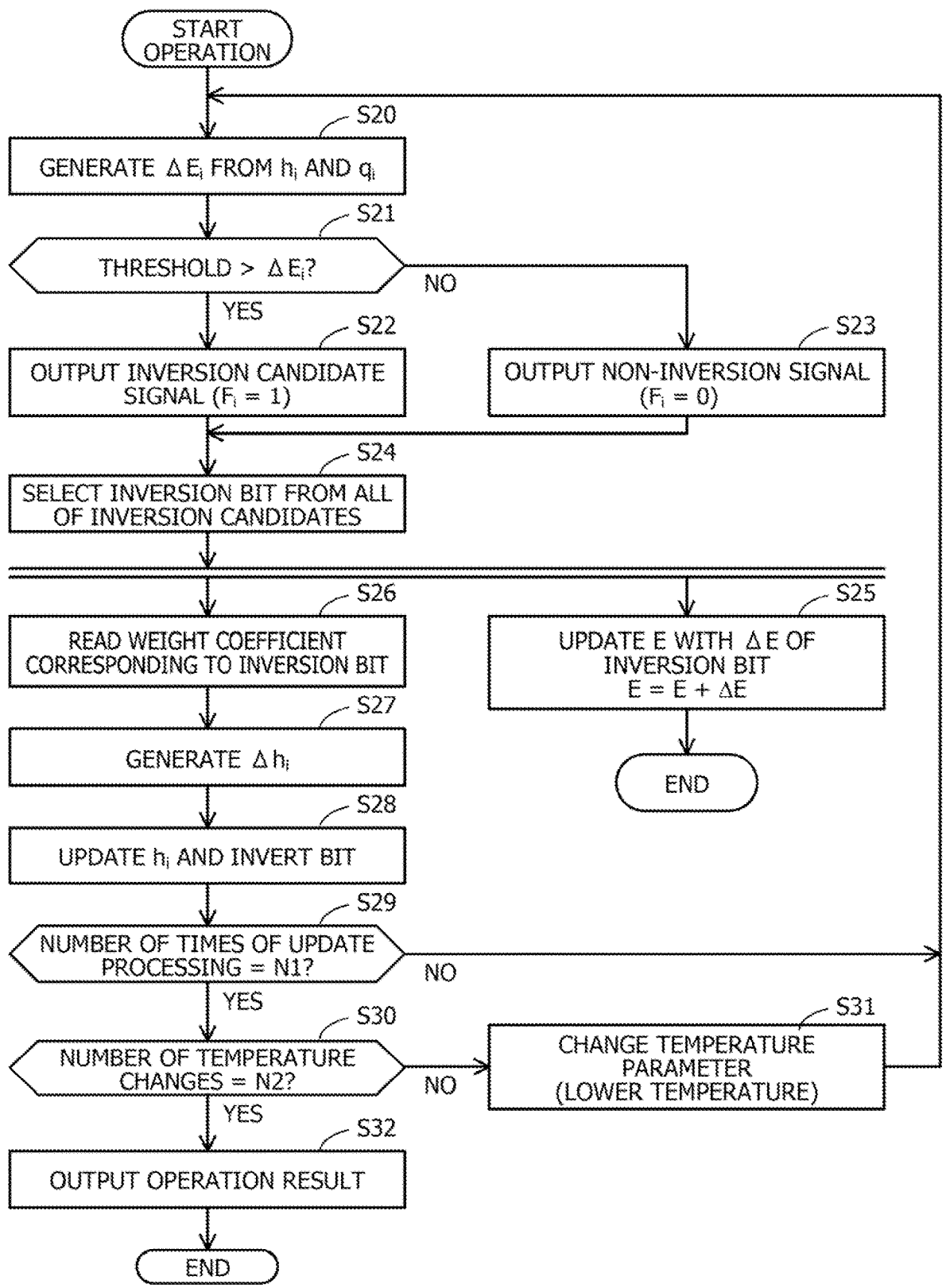
FIG. 12 is a flowchart illustrating an example of operation processing.

Here, in the description of FIG. 12, the LFE corresponding to the index=i is described as LFE 51ax (the first LFE is LFE 51a1 and the n-th LFE is LFE 51an). Each part included in the LFE 51ax is also described as, for example, SRAM 60ax by adding "x" to the end of the reference sign, for example. The operations by each of the LFEs 51a1, . . . , and 51an are executed in parallel.

(S20) The $\Delta$E generation unit 67ax generates the energy change amount $\Delta E_i$ in the case of inverting the bit $q_i$ on the basis of the local field $h_i$ stored in the h storage register 64ax and the bit $q_i$ stored in the bit storage register 66ax. The expression (2) is used to generate $\Delta E_i$. The $\Delta$E generation unit 67ax outputs the generated energy change amount $\Delta E_i$ to the determination unit 68ax and the random selector unit 52.

(S21) The determination unit 68ax compares the energy change amount $\Delta E_i$ generated by the $\Delta$E generation unit 67ax with the threshold value ($=-(T \cdot f^{-1}(u))$) generated by the threshold generation unit 53, and determines whether the threshold $> \Delta E_i$. In the case where the threshold $> \Delta E_i$, the processing proceeds to step S22. In the case where the threshold$\leq \Delta E_i$, the processing proceeds to step S23.

(S22) The determination unit 68ax outputs an inversion candidate signal ($F_i=1$) to the random selector unit 52. Then, the processing proceeds to step S24.

(S23) The determination unit 68*ax* outputs a non-inversion signal ($F_i=0$) to the random selector unit 52. Then, the processing proceeds to step S24.

(S24) The random selector unit 52 receives $q_i$, $F_i$, index=i, and $\Delta E_i$ from each of the LFE 51*ax*, and selects one inversion bit from among all the inversion candidates (bits corresponding to the LFE with $F_i=1$) output from the LFEs 51*a*1, ..., and 51*an*. Note that, the random selector unit 52 acquires the index=i of the LFE 51*ax* from the index storage register 69*ax* of the LFE 51*ax*. The random selector unit 52 outputs the index=j, $F_j$, and $q_j$ corresponding to the selected inversion bit to the LFEs 51*a*1, ..., and 51*an*. Furthermore, the random selector unit 52 outputs $\Delta E_j$ corresponding to the selected inversion bit to the adder 56. Then, next steps S25 (energy update processing) and S26 (state update processing) are started in parallel.

(S25) The adder 56 adds the energy change amount $\Delta E$ corresponding to the inversion bit to the energy value E to update the energy value E stored in the E storage register 57. That is, $E=E+\Delta E$. Then, the energy update processing is completed.

(S26) The selector 61*ax* acquires the index=j and the flag $F_j$ corresponding to the inversion bit, reads the weight coefficient corresponding to the inversion bit and the own bit from the SRAM 60*ax*, and supplies the read bits to the $\Delta h$ generation unit 62*ax*.

(S27) The $\Delta h$ generation unit 62*ax* generates $\Delta h_i$ on the basis of an inversion direction of the inversion bit and the weight coefficient $W_{ij}$ read by the selector 61*ax*. The expression (4) is used to generate $\Delta h_i$. Furthermore, the inversion direction of the inversion bit is determined according to the inversion bit $q_j$ (the bit before the inversion this time) output by the random selector unit 52.

(S28) The adder 63*ax* adds the $\Delta h_i$ generated by the $\Delta h$ generation unit 62*ax* to the local field $h_i$ stored in the h storage register 64*ax* to update the local field stored in the h storage register 64*ax*. Furthermore, the inversion determination unit 65*ax* determines whether the own bit has been selected as the inversion bit on the basis of the index=j and the flag $F_j$ output by the random selector unit 52. The inversion determination unit 65*ax* inverts the spin bit stored in the bit storage register 66*ax* in the case where the own bit has been selected as the inversion bit, or maintains the spin bit in the bit storage register 66*ax* in the case where the own bit has not been selected as the inversion bit. Here, the case where the own bit has been selected as the inversion bit means a case where the index=j=i and $F_j=1$ for the signal output by the random selector unit 52.

(S29) The control unit 25*a* determines whether the number of times of update processing of each spin bit held in the LFEs 51*a*1, ..., and 51*an* has reached N1 (the number of times of update processing=N1) in the current temperature parameter T. In the case where the number of times of update processing has reached N1, the processing proceeds to step S30. In the case where the number of times of update processing has not reached N1, the control unit 25*a* adds 1 to the number of times of update processing and advances the processing to step S20.

(S30) The control unit 25*a* determines whether the number of changes of the temperature parameter T has reached N2 (whether the number of temperature changes=N2). In the case where the number of temperature changes reaches N2, the processing proceeds to step S32. In the case where the number of temperature changes has not reached N2, the control unit 25*a* adds 1 to the number of temperature changes and advances the processing to step S31.

(S31) The control unit 25*a* changes the temperature parameter T. Specifically, the control unit 25*a* reduces the value of the temperature parameter T (corresponding to lowering the temperature) by the range of reduction according to the operating condition. Then, the processing proceeds to step S20.

(S32) The control unit 25*a* reads the spin bit stored in the bit storage register 66*ax* and outputs the spin bit as an operation result. Specifically, the control unit 25*a* reads the spin bits stored respectively in the bit storage registers 66*a*1, ..., and 66*an* and outputs the read spin bits to the CPU 21. That is, the control unit 25*a* supplies the read spin bit string to the CPU 21. Then, the operation processing is completed.

As described above, in the optimization device 25, the random selector unit 52 selects $\Delta E$ as well as q, F, and index, and the random selector unit 52 supplies $\Delta E$ to the energy calculation unit 55. Therefore, even if the circuit scale is increased, the increase in the length of the $\Delta E$ signal path can be suppressed.

Figure 13:
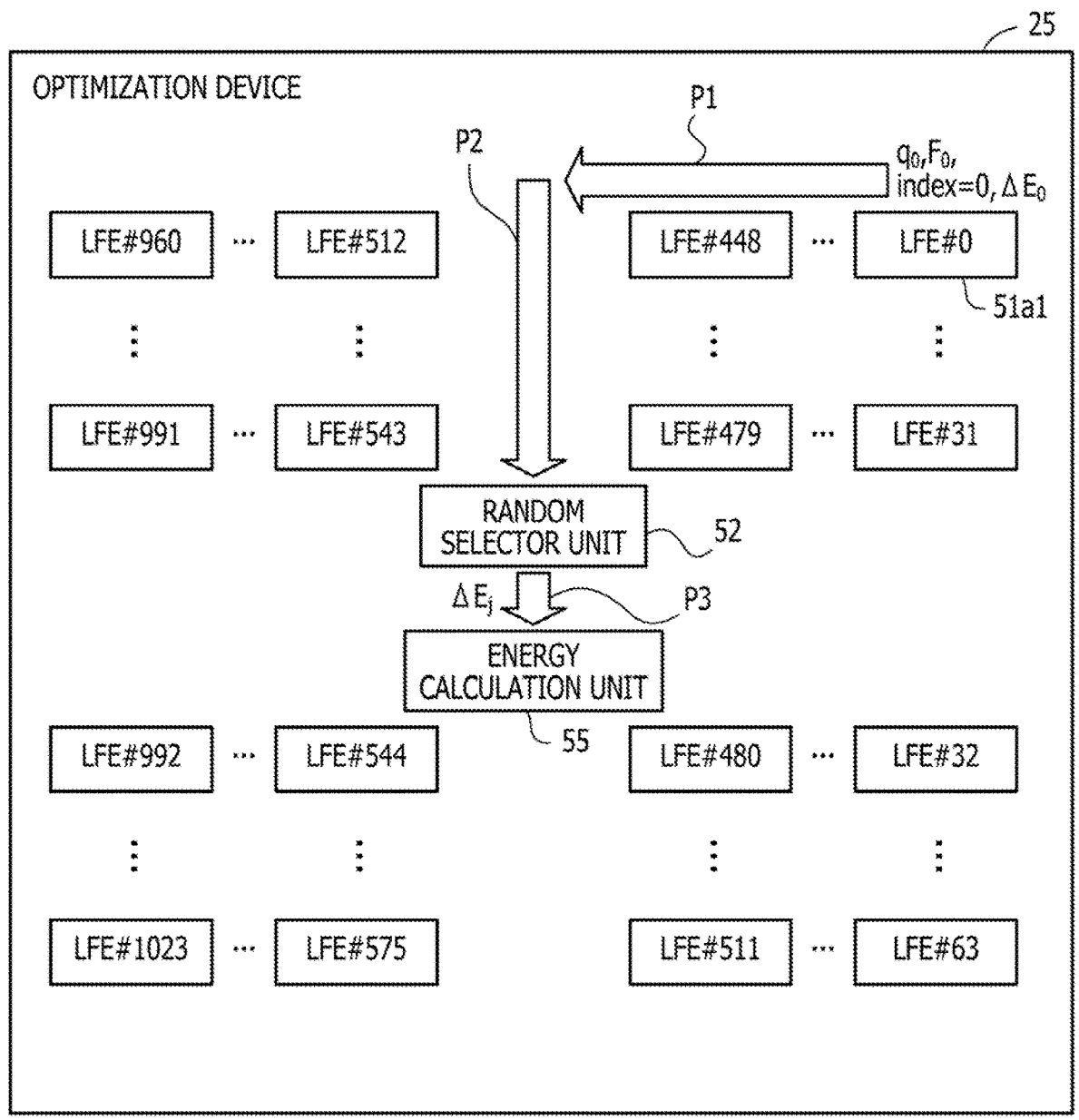
FIG. 13 is a diagram illustrating an example of a signal path by arrangement of LFEs.

FIG. 13 is a diagram lustrating an example of a signal path by arrangement of LFEs.

Each LFE is arranged on one surface (arrangement surface) within the chip of the optimization device 25 (inside the LFB 50), for example. FIG. 13 illustrates an example of a layout of each LFE, the random selector unit 52, and the energy calculation unit 55 when the arrangement surface is viewed from above. Here, as an example, the case where the LFB 50 includes 1024 LFEs is illustrated. Each LFE is given the index (=0, 1, ..., or 1023) of the corresponding LFE. For example, 256 LFEs are arranged in each of four regions on upper right side, lower right side, upper left side, and lower left side of the arrangement surface in FIG. 13.

Furthermore, the random selector unit 52 and the energy calculation unit 55 are arranged in the center of the arrangement surface. That is, the random selector unit 52 and the energy calculation unit 55 are arranged inside the above four regions where each LFE is arranged.

The signal path regarding $\Delta E_0$ of the LFE 51*a*1 (the index=0) will be described, but the same similarly applies to the other LFEs (reference signs omitted).

Each of sections P1, P2, and P3 is a section of the signal path that requires time $\tau$ for signal transmission. For example, the state signal including ($q_0$, $F_0$, the index=0, and $\Delta E_0$) output from the LFE 51*a*1 reaches the random selector unit 52 via the sections P1 and P2. Therefore, the time until the state signal reaches the random selector unit 52 is $2\tau$.

Moreover, $\Delta E_j$ output from the random selector unit 52 reaches the energy calculation unit 55 via the section P3. Therefore, the time until $\Delta E_j$ output from the random selector unit 52 reaches the energy calculation unit 55 is $\tau$.

The state signals are supplied in parallel from each LFE to the random selector unit 52. It is assumed that the lengths of the signal paths from each LFE to the random selector unit 52 are the same, or that the LFE 51*a*1 among the LFEs is the LFE farthest from the random selector unit 52. Then, the delay due to the signal path (the path passing through the sections P1, P2, and P3) from when the state signal is output by each LFE to when $\Delta E_j$ reaches the energy calculation unit 55 is $2\tau+\tau=3\tau$. This delay is shorter than a delay that occurs in a circuit configuration (FIG. 18) of a comparative example to be described below.

Next, an example of another circuit configuration of the optimization device 25 will be described.

Figure 14:
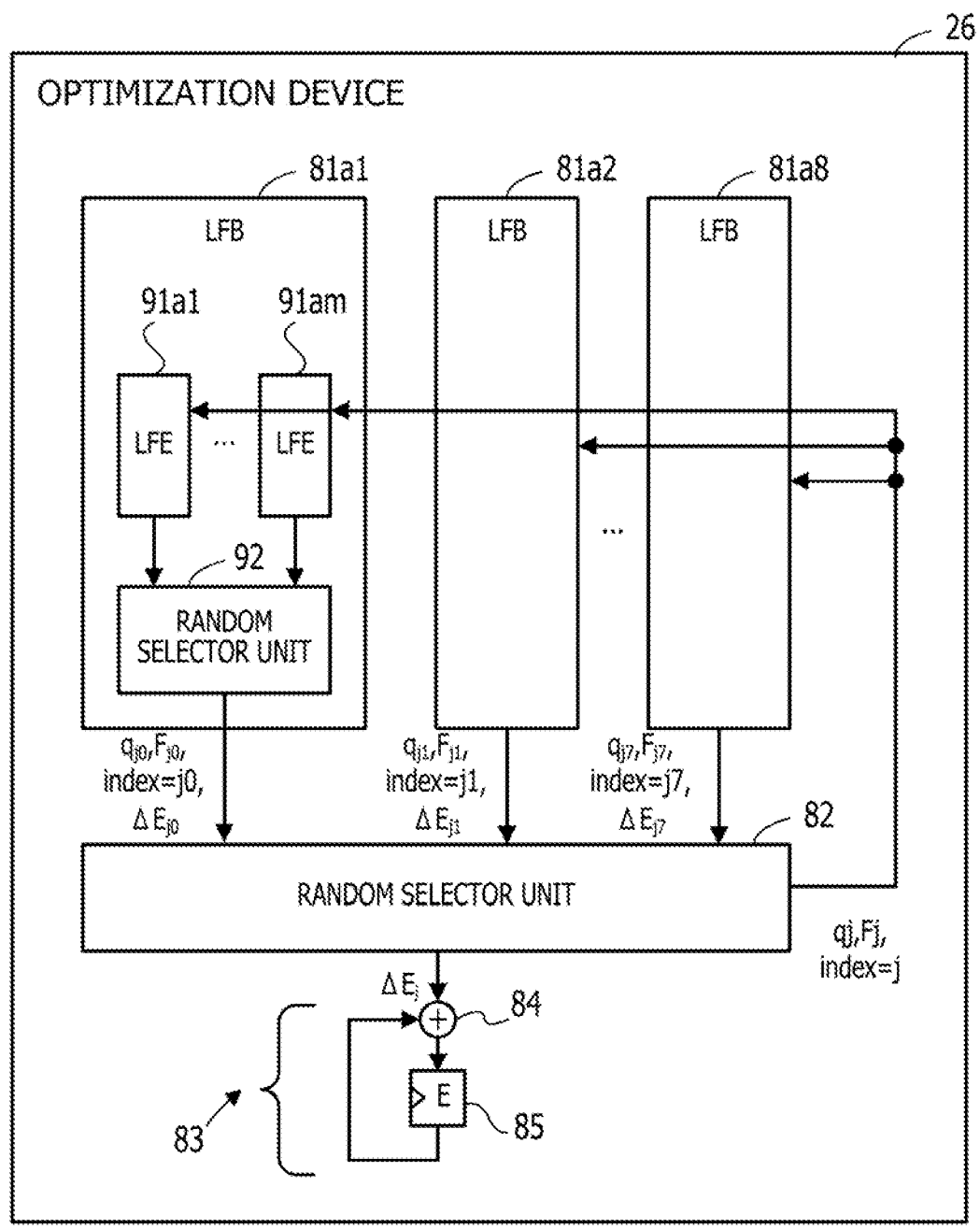
FIG. 14 is a diagram illustrating another example of the optimization device.

FIG. 14 is a diagram illustrating another example of the optimization device.

An optimization device 26 is, for example, a one-chip semiconductor integrated circuit, and is implemented by an FPGA or the like. The optimization device 26 is an example of the optimization device 1 according to the first embodiment.

An optimization device 26 is equipped with a plurality of LFBs. By installing the plurality of LFBs, the number of LFEs can be increased and the number of bits in the spin bit string can be increased. The optimization device 26 can be applied to a larger-scale problem as the number of bits in the spin bit string increases. As an example, the optimization device 26 includes eight LFBs. Furthermore, for example, one LFB includes 1024 LFEs. Here, it can be said that an LFB is a group of LFEs. Therefore, in the optimization device 26, it can be said that the plurality of LFEs is divided into a plurality of groups.

The optimization device 26 includes LFBs 81a1, 81a2, ..., and 81a8, a random selector unit 82, and an energy calculation unit 83. Note that the optimization device 26 includes a threshold generation unit (illustration is omitted) that supplies a threshold to each LFE of the LFBs 81a1, ..., and 81a8, and a random number generation unit (illustration is omitted) that supplies a random number to the random selector unit of each LFB of the LFBs 81a1, ..., and 81a8. Furthermore, the optimization device 26 also includes a control unit (illustration is omitted) that controls the operation by the optimization device 26 according to an instruction from the CPU 21.

Each of the LFBs 81a1, ..., and 81a8 has a circuit configuration similar to that of the LFB 50 described above. However, each of the LFBs 81a1, ..., and 81a8 is different from the LFB 50 in not including the energy calculation unit 55. Furthermore, each of the random selector units of the LFBs 81a1, ..., and 81a8 is different from the random selector unit 52 of the LFB 50 in outputting the selected state signal to the random selector unit 82. For example, the state signal output from the LFB 81a1 is a set of ($q_{j0}$, $F_{j0}$, the index=j0, and $\Delta E_{j0}$). Each of the LFBs 81a1, ..., and 81a8 is associated with an identification number (0, ..., or 8).

For example, the LFB 81a1 includes LFEs 91a1, ..., and 91am and a random selector unit 92. As described above, m=1024, for example. Each of the LFEs 91a1, ..., and 91am outputs a set (state signal) of ($q_i$, $F_i$, the index=i, and $\Delta E_i$) to the random selector unit 92. The random selector unit 92 preferentially selects the state signal with $F_i$=1 from among the state signals received from each of the LFEs 91a1, ..., and 91am and outputs the selected state signal to the random selector unit 82. The LFBs 81a2, ..., and 82a8 also have a circuit configuration similar to that of the LFB 81a1.

The random selector unit 82 receives the state signals output respectively from the LFBs 81a1, ..., and 81a8, and selects one of the state signals, the one corresponding to the inversion bit, on the basis of the plurality of received state signals. The random selector unit 82 receives the random number supply from the random number generation unit (illustration is omitted) and selects the state signal using the random number. The random selector unit 82 outputs the set of ($q_j$, $F_j$, and index=j) of the selected state signal to the LFBs 81a1, ..., and 81a8. The random selector unit 82 outputs $\Delta E_j$ of the selected state signal to the energy calculation unit 83.

The energy calculation unit 83 calculates the energy of the Ising model for the current spin bit string. The energy calculation unit 83 includes an adder 84 and an E storage register 85.

The adder 84 receives the energy change value $\Delta E_j$ output by the random selector unit 82 and adds $\Delta E_j$ to the energy value E stored in the E storage register 85, and outputs the energy value E to the E storage register 85.

The E storage register 85 takes in the energy value E output by the adder 84 in synchronization with a clock signal (not illustrated). The E storage register 85 is, for example, a flip-flop. Note that the initial value of the energy value E is calculated by the control unit 25a using the expression (1) and set in the E storage register 85.

In this way, the plurality of LFEs may be divided into a plurality of groups (plurality of LFBs) and implemented. In this case, the optimization device 26 further includes a random selector unit (including the random selector unit 92) provided for each of the plurality of groups. For example, the random selector unit 92 selects and outputs any one of the sets of the signal indicating inversion availability of the spin bit and the signal indicating the energy change value input respectively from the LFEs 91a1, ..., and 91am belonging to one group (LFB 81a1). At this time, the random selector unit 92 preferentially selects a set including the signal indicating inversion is available. The same similarly applies to the random selector units provided in the other LFBs. Then, the random selector unit 82 selects the spin bit to be inverted and the energy change value corresponding to the spin bit on the basis of the signal indicating inversion availability of the spin bit and the signal indicating the energy change value output by each of the random selector units of the LFBs. The random selector unit 82 outputs the signal indicating the selected spin bit to each LFE in the optimization device 26. Furthermore, the random selector unit 82 outputs the signal indicating the selected energy change value to the energy calculation unit 83.

The above-described random selector unit 82 can reduce the delay due to the signal path, similarly to the random selector unit 52.

Figure 15:
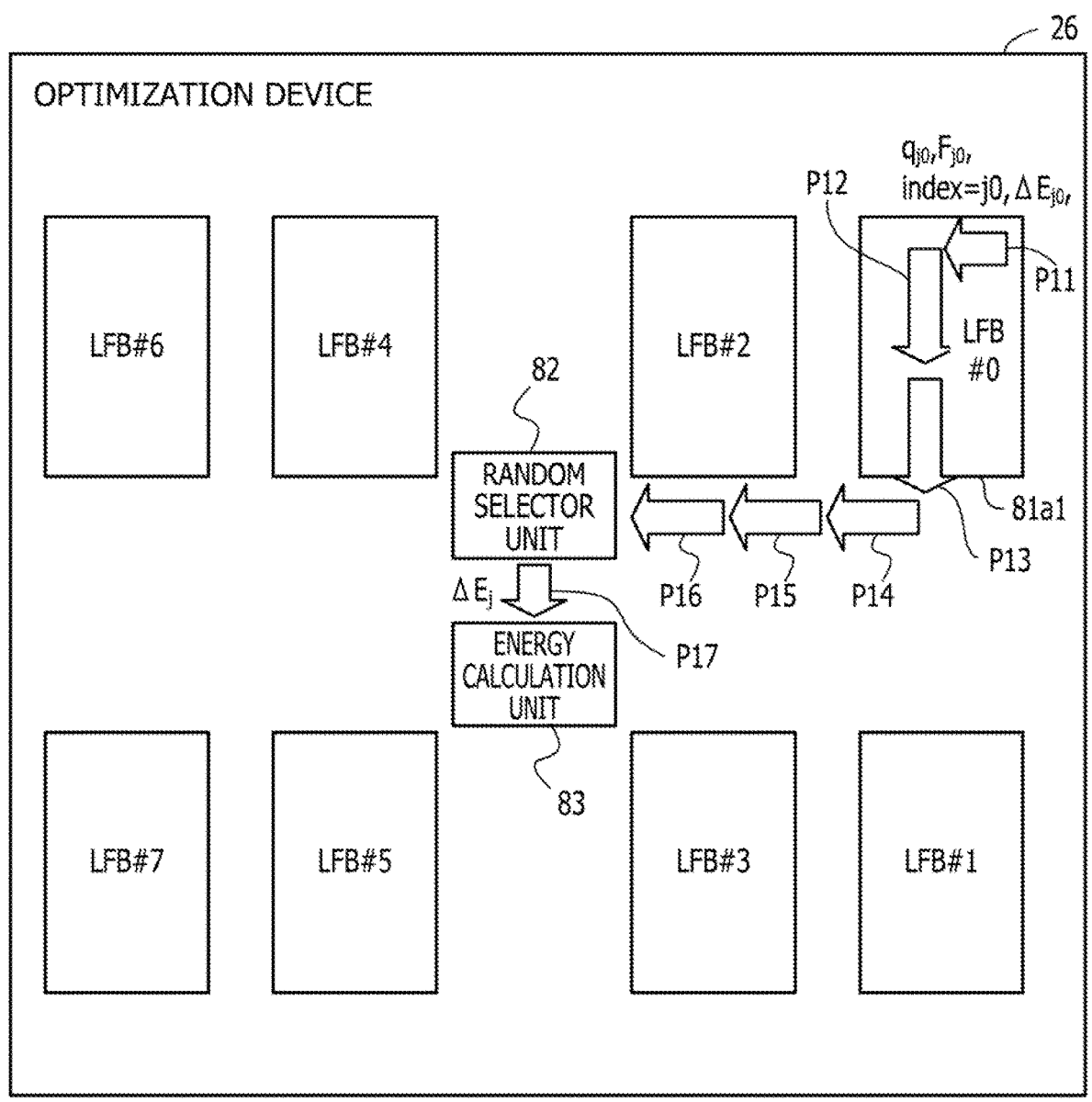
FIG. 15 is a diagram illustrating another example of the signal path.

FIG. 15 is a diagram illustrating another example of the signal path.

Each LFB is arranged on one surface (arrangement surface) within the chip of the optimization device 26, for example. FIG. 15 illustrates an example of a layout of each LFB, the random selector unit 82, and the energy calculation unit 83 when the arrangement surface is viewed from above. Note that an identification number (=0, ..., or 7) is given to each LFB. For example, two LFBs are arranged in each of four regions on upper right side (#0 and #2), lower right side (#1 and #3), upper left side (#4 and #6), and lower left side (#5 and #7) of the arrangement surface in FIG. 15.

Furthermore, the random selector unit 82 and the energy calculation unit 83 are arranged in the center of the arrangement surface. That is, the random selector unit 82 and the energy calculation unit 83 are arranged inside the above four regions where each LFB is arranged.

The signal path regarding $\Delta E_{j0}$ of the LFB 81a1 (identification number=0) will be described, but the same similarly applies to the other LFBs (reference signs omitted).

Each of sections P11, P12, P13, P14, P15, and P16 is a section of the signal path that requires time T for signal transmission. For example, the state signal including ($q_{j0}$, $F_{j0}$, the index=j0, and $\Delta E_{j0}$) output from the LFB 81a1 reaches the random selector unit 82 via the sections P11, P12, P13, P14, P15, and P16. Therefore, the time until the state signal reaches the random selector unit 82 is 6T.

Moreover, $\Delta E_j$ output from the random selector unit 82 reaches the energy calculation unit 83 via the section P17. Therefore, the time until $\Delta E_j$ output from the random selector unit 82 reaches the energy calculation unit 83 is T.

The state signals are supplied in parallel from each LFB to the random selector unit 82. It is assumed that the lengths of the signal paths from the LFEs to the random selector unit 82 are the same, or that the LFB 81a1 among the LFBs is the LFB farthest from the random selector unit 82. Then, the delay due to the signal path (the path passing through the sections P11, P12, P13, P14, P15, P16, P17) from when the state signal is output by each LFB to when $\Delta E_j$ reaches the energy calculation unit 83 is 6T+T=7T. This delay is shorter than a delay that occurs in a circuit configuration (FIG. 19) of a comparative example to be described below.

Next, a circuit configuration of the comparative example for the optimization device 25 will be described.

Figure 16:
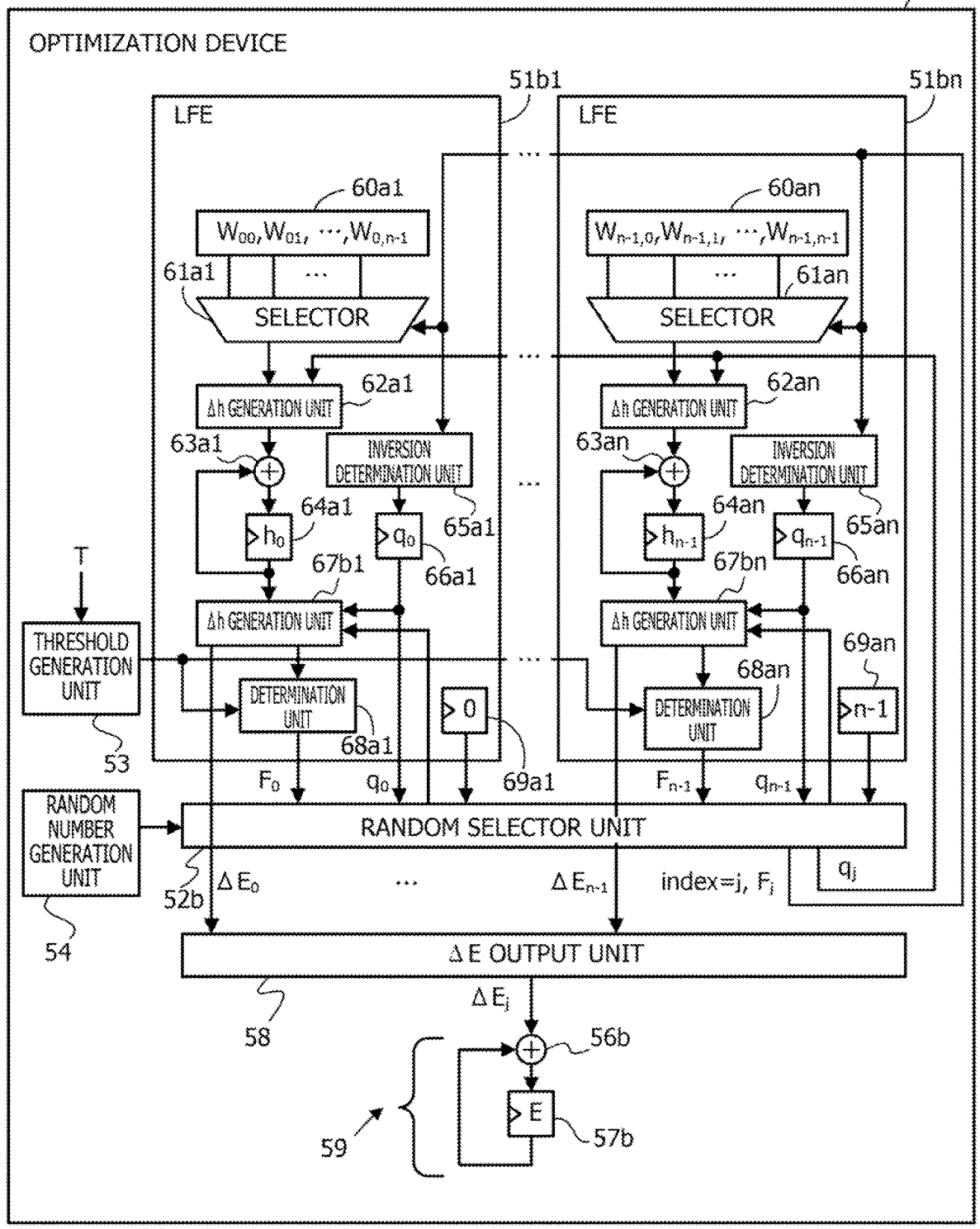
FIG. 16 is a diagram illustrating a comparative example of the circuit configuration of the optimization device.

FIG. 16 is a diagram illustrating a comparative example of the circuit configuration of the optimization device.

An optimization device 27 (the LFB of the optimization device 27) includes LFEs 51b1, . . . , and 51bn, a random selector unit 52b, a threshold generation unit 53, a random number generation unit 54, a $\Delta E$ output unit 58, and an energy calculation unit 59. The optimization device 27 includes a control unit that controls the operation by the optimization device 27 according to an instruction from the CPU 21, but illustration is omitted.

Each of the LFEs 51b1, . . . , and 51bn is used as one bit of the spin bit. n is an integer of 2 or larger and indicates the number of LFEs included in the optimization device 27. Identification information (index) of the LFE is associated with each of the LFEs 51b1, . . . , and 51bn. The index=0, 1, . . . , or n−1 for each of the LFEs 51b1, 51b2, . . . , and 51bn.

The circuit configuration of the LFE 51b1 will be described below. The LFEs 51b2, . . . , and 51bn are also implemented with a circuit configuration similar to the LFE 51b1.

The LFE 51b1 includes an SRAM 60a1, a selector 61a1, a $\Delta h$ generation unit 62a1, an adder 63a1, an h storage register 64a1, an inversion determination unit 65a1, a bit storage register 66a1, a $\Delta E$ generation unit 67b1, a determination unit 68a1, and an index storage register 69a1. The LFE 51b1 is different from the LFE 51a1 in including the $\Delta E$ generation unit 67b1 instead of the $\Delta E$ generation unit 67a1. Therefore, the $\Delta E$ generation unit 67b1 will be mainly described.

The $\Delta E$ generation unit 67b1 calculates an energy change amount $\Delta E_0$ of the Ising model according to the inversion of the own bit by the expression (2) on the basis of the local field $h_0$ of the h storage register 64a1 and the spin bit of the bit storage register 66a1. When the $\Delta E$ generation unit 67b1 receives a predetermined instruction signal from the random selector unit 52b, the $\Delta E$ generation unit 67b1 outputs a calculated energy change amount $\Delta E_0$ to the $\Delta E$ output unit 58. Note that, when the $\Delta E$ generation unit 67b1 receives no instruction signal from the random selector unit 52b, the $\Delta E$ generation unit 67b1 outputs 0 to the $\Delta E$ output unit 58.

The random selector unit 52b receives the spin bit, the flag indicating inversion availability of the spin bit, and the index from each of the LFEs 51b1, . . . , and 51bn. The random selector unit 52b selects the bit to be inverted (inversion bit) from the invertible spin bits.

The random selector unit 52b supplies the current bit value (bit $q_j$) of the selected inversion bit to the $\Delta h$ generation units 62a1, . . . , and 62an included in the LFEs 51b1, . . . , and 51bn.

The random selector unit 52b supplies the index=j of the inversion bit and the flag $F_j$ indicating the inversion availability to the selectors 61a1, . . . , and 60an and the inversion determination units 65a1, . . . , and 65an included in the LFEs 51b1, . . . , and 51bn.

The random selector unit 52b outputs an instruction signal for outputting $\Delta E$ to the $\Delta E$ generation unit of the LFE (LFE corresponding to the index=j) corresponding to the selected inversion bit. That is, the random selector unit 52b is different from the random selector unit 52 in not selecting and outputting $\Delta E$.

The threshold generation unit 53 and the random number generation unit 54 have the functions described with reference to FIG. 8. Note that the random number generation unit 54 supplies the generated random number to the random selector unit 52b.

The $\Delta E$ output unit 58 is an OR circuit that receives input of $\Delta E_0$, . . . , and $\Delta E_{n-1}$ from each of the $\Delta E$ generation units of the LFEs 51b1, . . . , and 51bn, and outputs $\Delta E_j$ by the OR logic for the received $\Delta E_0$, . . . , and $\Delta E_{n-1}$. Here, the $\Delta E$ input to the $\Delta E$ output unit 58 is $\Delta E = \Delta E_j$ for the LFE that has received the instruction signal from the random selector unit 52b, and $\Delta E = 0$ for the other LFEs. The $\Delta E$ output unit 58 outputs $\Delta E_j$ to the energy calculation unit 59.

The energy calculation unit 59 calculates the energy of the Ising model for the current spin bit string. The energy calculation unit 59 includes an adder 56b and an E storage register 57b. The adder 56b receives the energy change amount $\Delta E_j$ output by the $\Delta E$ output unit 58 and adds $\Delta E_j$ to the energy value E stored in the E storage register 57b, and outputs the energy value E to the E storage register 57b. The E storage register 57b takes in the energy value E output by the adder 56b in synchronization with a clock signal (not illustrated).

Next, a comparative example of the operation processing by the optimization device 27 will be described.

Figure 17:
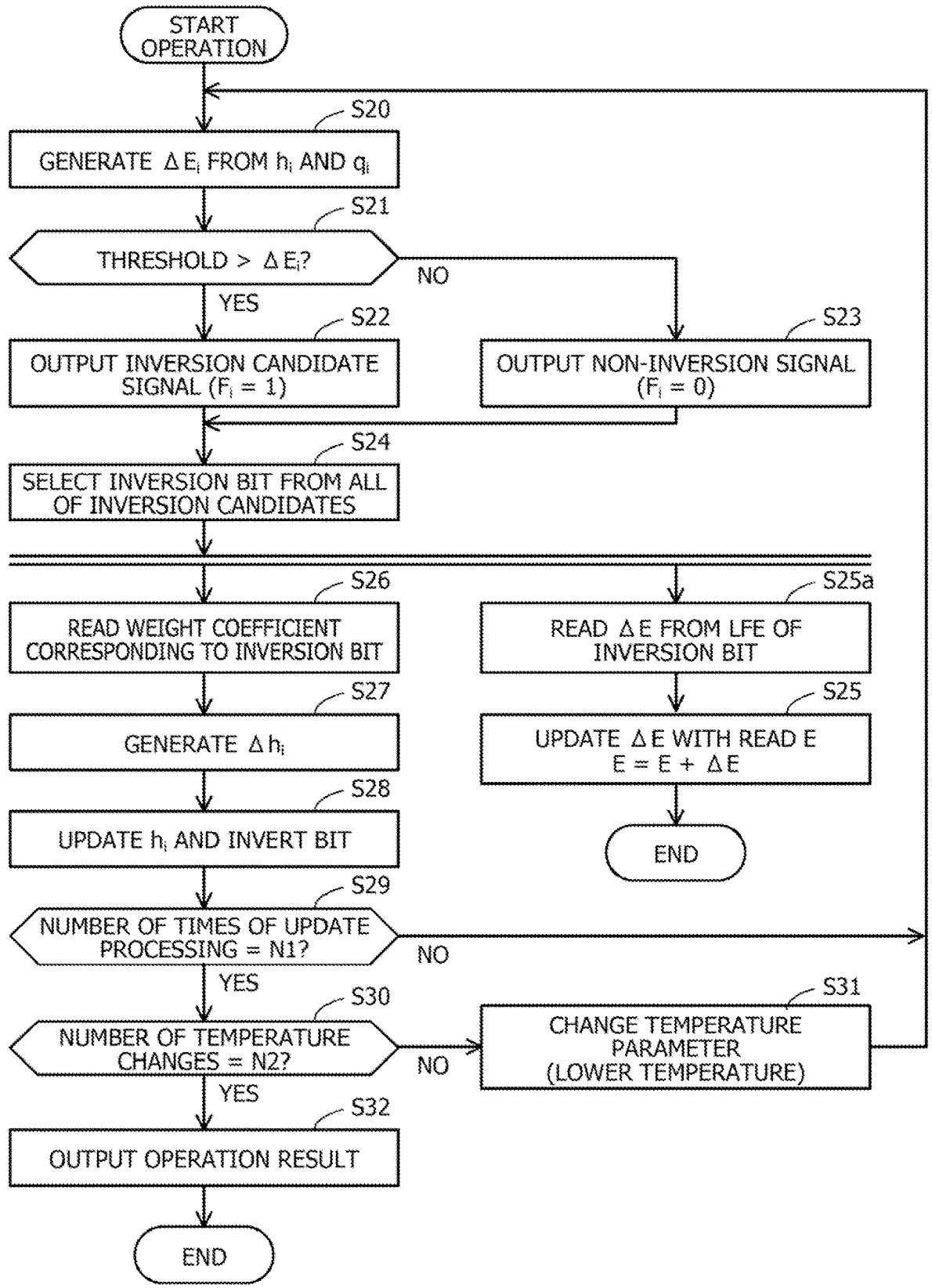
FIG. 17 is a flowchart illustrating a comparative example of the operation processing.

FIG. 17 is a flowchart illustrating a comparative example of the operation processing.

Here, in the description of FIG. 17, the LFE corresponding to the index=i is described as LFE 51bx (the first LFE is LFE 51b1 and the n-th LFE is LFE 51bn).

The procedure of the comparative example is different from the procedure described in FIG. 12 in executing step S25a after executing step S24 and before executing step S25, and is similar to the procedure in FIG. 12 in the other steps. Therefore, step S25a will be mainly described, and description of the other steps will be omitted.

Note that, in step S20, the $\Delta E$ generation unit 67bx supplies the generated $\Delta E$ only to the determination unit 68ax and does not supply $\Delta E$ to the random selector unit 52b. The $\Delta E$ generation unit 67bx outputs $\Delta E = 0$ to the $\Delta E$ output unit 58 unless the instruction signal is received from the random selector unit 52b. Further, in step S24, the random selector unit 52b does not output $\Delta E$. Moreover, step S25a is executed in parallel with step S26 after the execution of step S24.

(S25a) The $\Delta E$ output unit 58 reads $\Delta E$ from the LFE of the inversion bit. Specifically, the random selector unit 52b outputs an instruction signal instructing the output of $\Delta E$ to the $\Delta E$ generation unit included in the LFE of the selected inversion bit. The $\Delta E$ generation unit outputs the $\Delta E_j$ generated in step S20 to the $\Delta E$ output unit 58. In this way, the $\Delta E$ output unit 58 reads $\Delta E$. The $\Delta E$ output unit 58 receives $\Delta E = \Delta E_j$ from the $\Delta E$ generation unit and outputs $\Delta E_j$ to the adder 56b by the OR logic with another $\Delta E = 0$.

As described above, in the procedure of the comparative example, step S25a is additionally executed as compared with the procedure in FIG. 12. Here, an example of a signal path (traffic path) in reading ΔE in step S25a will be described.

Figure 18:
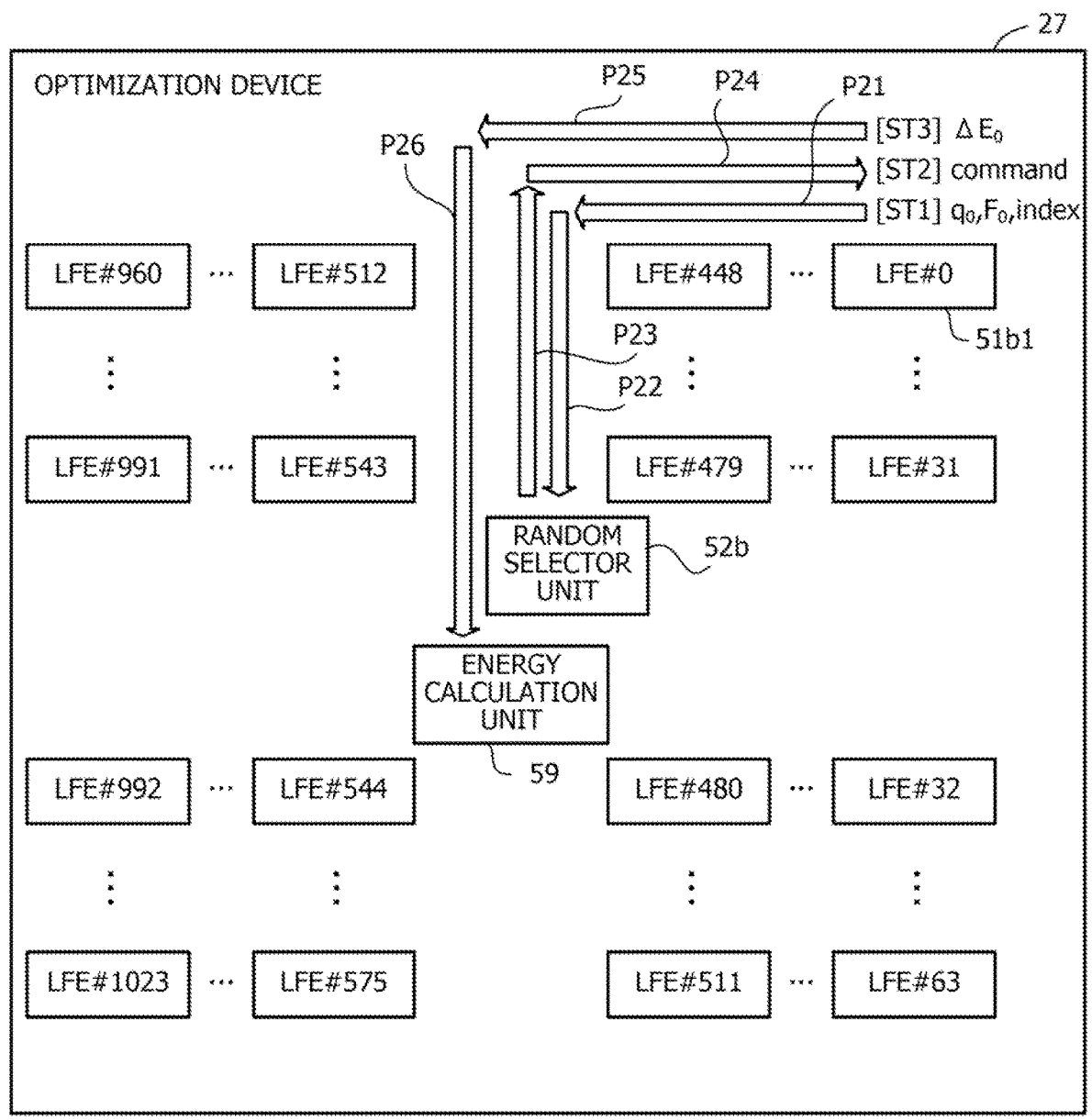
FIG. 18 is a diagram illustrating a comparative example of the signal path.

FIG. 18 is a diagram illustrating a comparative example of the signal path.

In the optimization device 27, the random selector unit 52b and the energy calculation unit 59 are arranged in the center of the arrangement surface of the chip, and each LFE is arranged around the random selector unit 52b and the energy calculation unit 59, as in the optimization device 25.

Hereinafter, the signal path regarding $\Delta E_0$ of the LFE 51b1 (the index=0) will be described, but the same similarly applies to the other LFEs (reference signs omitted).

Each of sections P21, P22, P23, P24, P25, and P26 is a section of the signal path that requires time T for signal transmission. The LFE 51b1 outputs the state signal including ($q_0$, $F_0$, the index=0) (step ST1). For example, the state signal output from the LFE 51b1 reaches the random selector unit 52b via the sections P21 and P22. Therefore, the time until the state signal reaches the random selector unit 52b is 2T.

The random selector unit 52b selects the inversion bit according to the state signal received from each LFE. Here, as an example, it is assumed that $q_0$ is selected as the inversion bit by the random selector unit 52b. The random selector unit 52b outputs an instruction signal (command in the figure) instructing the output of $\Delta E_0$ to the ΔE generation unit 67b1 of the LFE 51b1 (step ST2). For example, the instruction signal reaches the ΔE generation unit 67b1 via the sections P23 and P24. Therefore, the time from when the instruction signal is output from the random selector unit 52b to when the instruction signal reaches the ΔE generation unit 67b1 is 2T.

When the ΔE generation unit 67b1 receives the instruction signal, the ΔE generation unit 67b1 outputs $\Delta E_0$ to the energy calculation unit 59 via the ΔE output unit 58 (step ST3). For example, the signal indicating $\Delta E_0$ reaches the energy calculation unit 59 via the sections P25 and P26 (including the ΔE output unit 58). Therefore, the time from when the signal indicating $\Delta E_0$ is output from the ΔE generation unit 67b1 to when the signal reaches the energy calculation unit 59 is 2T.

The state signals are supplied in parallel from each LFE to the random selector unit 52b. It is assumed that the lengths of the signal paths from each LFE to the random selector unit 52b are the same, or that the LFE 51b1 among the LFEs is the LFE farthest from the random selector unit 52b and the energy calculation unit 59. Then, the delay (the maximum value of the delay) due to the signal path (the path passing through the sections P21 to P26) from when the state signal is output by each LFE to when $\Delta E_j$ reaches the energy calculation unit 59 is 2T+2T+2T=6T.

The delay 6T is compared to the delay 3T in FIG. 13 (6T>3T). That is, in the optimization device 25 of the second embodiment, the delay until starting the energy calculation processing is suppressed as compared with the circuit configuration of the comparative example.

Furthermore, it is also conceivable to use a plurality of LFBs in the comparative example to expand the circuit scale as illustrated in FIG. 14.

Figure 19:
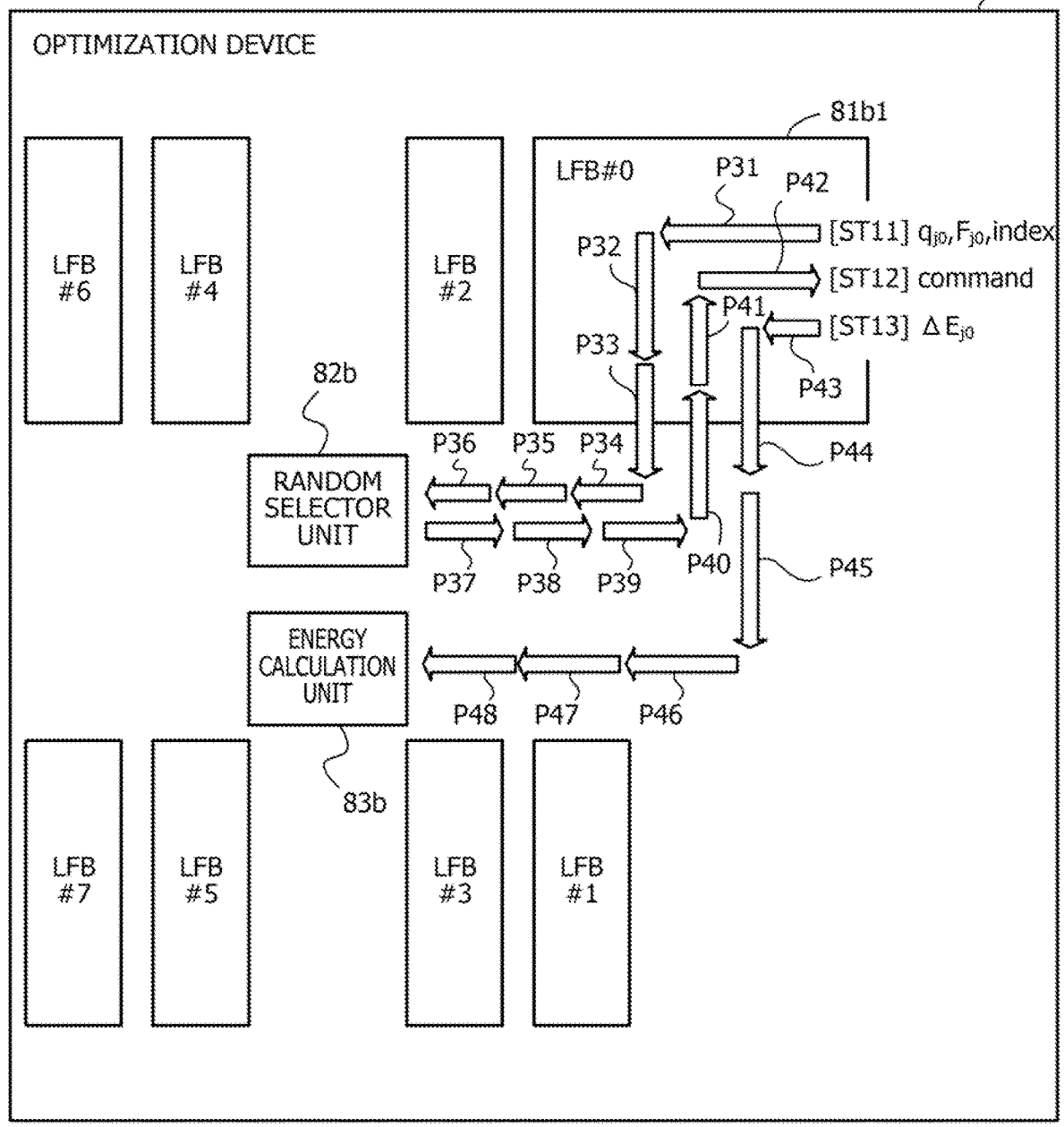
FIG. 19 is a diagram illustrating another comparative example of the signal path.

FIG. 19 is a diagram illustrating another comparative example of the signal path.

An optimization device 28 is a comparative example with respect to the optimization device 26. The optimization device 28 includes a plurality of LFBs (identification numbers=0, . . . , and 7) including the LFB 81b1, a random selector unit 82b, and an energy calculation unit 83b. The optimization device 28 includes a ΔE output unit that supplies ΔE to the energy calculation unit 83b. Note that, in FIG. 19, illustration of the ΔE output unit is omitted.

Each random selector unit of the plurality of LFBs including the LFB 81b1 does not select and output ΔE, and instructs the ΔE generation unit corresponding to the selected inversion bit to output ΔE to the ΔE output unit of the LFE.

In the optimization device 28, the random selector unit 82b and the energy calculation unit 83b are arranged in the center of the arrangement surface of the chip, and each LFB is arranged around the random selector unit 82b and the energy calculation unit 83b, as in the optimization device 26.

The signal path regarding $\Delta E_{j0}$ of the LFB 81b1 (identification number=0) will be described, but the same similarly applies to the other LFBs (reference signs omitted).

Each of sections P31, P32, and P48 is a section of the signal path that requires time T for signal transmission. The LFE 81b1 outputs the state signal including ($q_{j0}$, $F_{j0}$, and the index=j0) (step ST11). For example, the state signal output from the LFE 81b1 reaches the random selector unit 82b via the sections P31, P32, P33, P34, P35, and P36. Therefore, the time until the state signal reaches the random selector unit 82b is 6T.

The random selector unit 82b selects the inversion bit according to the state signal received from each LFB. Here, as an example, it is assumed that $q_{j0}$ is selected as the inversion bit by the random selector unit 82b. The random selector unit 82b outputs an instruction signal (command in the figure) instructing output of $\Delta E_{j0}$ to the ΔE generation unit of the LFE corresponding to $q_{j0}$ of the LFB 81b1 (step ST12). For example, the instruction signal reaches the ΔE generation unit via the sections P37, P38, P39, P40, P41, and P42. Therefore, the time until the instruction signal reaches the ΔE generation unit is 6T.

When the ΔE generation unit receives the instruction signal, the ΔE generation unit outputs $\Delta E_{j0}$ to the energy calculation unit 83b via the ΔE output unit (step ST13). For example, the signal indicating $\Delta E_{j0}$ reaches the energy calculation unit 83b via the sections P43, P44, P45, P46, P47, and P48 (including the ΔE output unit 58). Therefore, the time from when the signal indicating $\Delta E_{j0}$ is output from the ΔE generation unit to when the signal reaches the energy calculation unit 83b is 6T.

The state signals are supplied in parallel from each LFB to the random selector unit 82b. It is assumed that the lengths of the signal paths from each LFB to the random selector unit 82b are the same, or that the LFB 81b1 among the LFEs is the LFB farthest from the random selector unit 82b and the energy calculation unit 83b. Then, the delay (the maximum value of the delay) due to the signal path (the path passing through the sections P31 to P48) from when the state signal is output by each LFB to when $\Delta E_j$ reaches the energy calculation unit 83b is 6T+6T+6T=18T.

The delay 18T is compared to the delay 6T in FIG. 15 (18T>6T). That is, in the optimization device 26 of the second embodiment, the delay until starting the energy calculation processing is suppressed as compared with the circuit configuration of the comparative example.

Here, in the procedure of the operation processing of the comparative example illustrated in FIG. 17, step S25a is additionally executed as compared with the procedure in FIG. 12. The delay due to step S25a is, for example, 6T in the circuit configuration in FIG. 18, and 18T in the circuit configuration in FIG. 19. The larger the circuit scale, the larger the delay. Then, the time required for completion of update of the energy E by steps S25a and S25 may become longer than one cycle of the mainstream processing (steps S26 to S28 and steps S20 to S24) related to the state update. In this case, the energy E update processing becomes a bottleneck, and the operation performance may deteriorate.

Therefore, in the optimization device 25, the random selector unit 52 selects the bit to be inverted, selects the energy change value ΔE, and outputs the energy change value ΔE to the energy calculation unit 55, so that the delay in the energy E update processing can be reduced. Specifically, in the optimization device 25, as illustrated in FIG. 12, it is not necessary to execute step S25a in FIG. 17, and the ΔE output unit 58 is also unnecessary as in the circuit configuration of the comparative example. Thereby, the update processing for the energy E becomes a bottleneck and the operation speed can be suppressed.

Furthermore, it is also conceivable to mount a plurality of LFBs to increase the scale of the spin bit string, as in the optimization device 26. Even in this case, the random selector unit 82 selects the bit to be inverted, selects the energy change value ΔE, and outputs the energy change value ΔE to the energy calculation unit 83, so that the delay in the energy E update processing can be reduced. Thereby, the update processing for the energy E becomes a bottleneck and the operation speed can be suppressed.

Here, for example, comparing the signal path illustrated in FIG. 18 with the signal path illustrated in FIG. 13, the circuit configuration in FIG. 13 is absent from a physical pressure on wiring as compared with the circuit configuration of the comparative example in FIG. 18. Specifically, in the circuit configuration of the comparative example in FIG. 18, a signal path for outputting the signal indicating ΔE from the LFE 51b1 to the energy calculation unit 59 (or the ΔE output unit 58) is present. As a signal path corresponding to the signal path, in the circuit configuration of the optimization device 25 in FIG. 13, a signal path for outputting the signal indicating ΔE from the LFE 51a1 to the random selector unit 52 is present.

Therefore, in the circuit configuration of the optimization device 25 in FIG. 13, there is no significant change in the number of wirings as compared with the circuit configuration of the comparative example. Therefore, there is no change in the difficulty in mounting regarding the wiring surface, and the delay in the energy E update processing can be reduced without a physical pressure on the wiring. Furthermore, scale expansion can be implemented without causing a problem of wiring properties.

Similarly, in the circuit configuration of the optimization device 26 in FIG. 15, the delay in the energy E update processing can be reduced without a physical pressure on the wiring, as compared with the circuit configuration of the comparative example in FIG. 19 Furthermore, scale expansion can be implemented without causing a problem of wiring properties.

The above description merely describes the principle of the present invention. Moreover, numerous modifications and variations are able to be made by those skilled in the art, and the present invention is not limited to the above-described or illustrated exact configuration and application example, and all corresponding modifications and equivalents are regarded to fall within the scope of the present invention by appended claims and equivalents thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optimization device comprising:
    a memory; and
    a processor coupled to the memory and configured to:
        calculate, as a plurality of bit operations, when any bit in a bit string representing a state of an Ising model is inverted, an energy change value of the Ising model on the basis of a coefficient indicating magnitude of an interaction between an own bit and the inverted bit in the bit string;
        output a first signal indicating inversion availability of the own bit according to the energy change value and a second signal indicating the energy change value;
        select the bit to be inverted in the bit string and the energy change value corresponding to the bit based on the first signal, the second signal;
        output a third signal indicating the selected bit to each of the plurality of bit operations;
        output a fourth signal indicating the selected energy change value;
        calculate energy of the Ising model on the basis of the energy change value indicated by the fourth signal; and
        receive a plurality of sets of the first signal and the second signal, select and output any one set from the plurality of sets, giving priority to a set including the first signal indicating that inversion is available, receive a plurality of sets of the first signal and the second signal respectively in a previous stage, and select and output any one set from the plurality of sets, giving priority to a set including the first signal indicating that inversion is available.

2. The optimization device according to claim 1, wherein the plurality of bit operations is divided into a plurality of groups, the processor is configured to select and output any one set from sets of the first signal and the second signal respectively belonging to one group, and provided in each of the plurality of groups is further included, and outputs the third signal and the fourth signal on the basis of the first signal and the second signal.

3. The optimization device according to claim 1, wherein the processor, as each of the plurality of bit operations, output a fifth signal indicating a value of the own bit, select a value of the bit to be inverted together with the energy change value on the basis of the fifth signal, and output the third signal including the selected value of the bit.

4. The optimization device according to claim 1, wherein the processor, as each of the plurality of bit operations, output a sixth signal indicating identification information of the each bit operation, select the identification information of the bit operation corresponding to the bit to be inverted together with the energy change value on the basis of the sixth signal, and output the third signal including the selected identification information.

5. A method of controlling an optimization device, the method comprising:
    by each of a plurality of bit operation circuits included in the optimization device, when any bit in a bit string representing a state of an Ising model is inverted, calculating an energy change value of the Ising model on the basis of a coefficient indicating magnitude of an interaction between an own bit and the inverted bit in the bit string, and outputting a first signal indicating inversion availability of the own bit according to the energy change value and a second signal indicating the energy change value;

by a selection circuit included in the optimization device, selecting the bit to be inverted in the bit string and the energy change value corresponding to the bit based on the first signal, the second signal, and outputting a third signal indicating the selected bit to each of the plurality of bit operation circuits and outputting a fourth signal indicating the selected energy change value; and by an energy calculation circuit included in the optimization device, calculating energy of the Ising model on the basis of the energy change value indicated by the fourth signal, the selection circuit is configured to receive a plurality of sets of the first signal and the second signal, select and output any one set from the plurality of sets, giving priority to a set including the first signal indicating that inversion is available, receive a plurality of sets of the first signal and the second signal respectively in a previous stage, and select and output any one set from the plurality of sets, giving priority to a set including the first signal indicating that inversion is available.

6. An optimization device comprising:

a memory; and a processor coupled to the memory and configured to:

calculate, as a plurality of bit operations, when any bit in a bit string representing a state of an Ising model is inverted, an energy change value of the Ising model on the basis of a coefficient indicating magnitude of an interaction between an own bit and the inverted bit in the bit string;

output a first signal indicating inversion availability of the own bit according to the energy change value and a second signal indicating the energy change value;

select the bit to be inverted in the bit string and the energy change value corresponding to the bit on the basis of the first signal and the second signal;

output a third signal indicating the selected bit to each of the plurality of bit operations;

output a fourth signal indicating the selected energy change value;

calculate energy of the Ising model on the basis of the energy change value indicated by the fourth signal;

receive a plurality of sets of the first signal and the second signal;

select and output any one set from the plurality of sets, giving priority to a set including the first signal indicating that inversion is available;

receive a plurality of sets of the first signal and the second signal respectively in a previous stage; and select and output any one set from the plurality of sets, giving priority to a set including the first signal indicating that inversion is available.

\* \* \* \* \*